US010455122B2

(12) United States Patent
Yamashita et al.

(10) Patent No.: US 10,455,122 B2
(45) Date of Patent: Oct. 22, 2019

(54) PROFILE ADJUSTMENT METHOD, PROFILE ADJUSTMENT APPARATUS, AND PROFILE ADJUSTMENT SYSTEM

(71) Applicant: SEIKO EPSON CORPORATION, Tokyo (JP)

(72) Inventors: Mitsuhiro Yamashita, Nagano (JP); Kenji Fukasawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/143,618

(22) Filed: Sep. 27, 2018

(65) Prior Publication Data

US 2019/0104234 A1    Apr. 4, 2019

(30) Foreign Application Priority Data

Sep. 29, 2017    (JP) ................. 2017-189322

(51) Int. Cl.
| | |
|---|---|
| H04N 1/60 | (2006.01) |
| G01J 3/52 | (2006.01) |
| H04N 1/50 | (2006.01) |
| G01J 3/46 | (2006.01) |
| H04N 1/64 | (2006.01) |

(52) U.S. Cl.
CPC ............ *H04N 1/6008* (2013.01); *G01J 3/462* (2013.01); *G01J 3/463* (2013.01); *G01J 3/52* (2013.01); *H04N 1/50* (2013.01); *H04N 1/603* (2013.01); *H04N 1/6033* (2013.01); *H04N 1/646* (2013.01)

(58) Field of Classification Search
CPC ........ H04N 1/6008; H04N 1/50; H04N 1/603; H04N 1/646; G01J 3/462; G01J 3/463; G01J 3/52
See application file for complete search history.

(56) References Cited

U.S. PATENT DOCUMENTS

2013/0128289 A1* 5/2013 Sawatzki ............... G06K 15/02
                                                                358/1.9
2017/0208216 A1* 7/2017 Sawada .............. H04N 1/00408

FOREIGN PATENT DOCUMENTS

JP    2005-348210 A    12/2005

* cited by examiner

*Primary Examiner* — Quang N Vo

(57) ABSTRACT

Device-independent coordinate values at an adjustment point are converted into second coordinate values in accordance with a B2A table of an output profile, and the second coordinate values are converted into adjustment target PCS values, which are the device-independent coordinate values, in accordance with an A2B table of the output profile. When values obtained by adding relative values of an adjustment target using PCS coordinates as a reference, are assumed as target PCS values, in an optimization step, an optimization process is carried out to obtain an optimal solution of adjustment color values. The optimization process includes an element for bringing provisional PCS values, obtained by converting, in accordance with the A2B table, provisional color values obtained by adding adjustment color values to the adjustment target color values, closer to the target PCS values.

20 Claims, 17 Drawing Sheets

| |
|---|
| (a-2) USE PROFILE ALONE: ADJUSTMENT TARGET IS OUTPUT PROFILE<br><br>$cmyk_p = f_{icc}(OutputProfile, B2A, Input)$ |
| (a-3) USE PROFILE ALONE: ADJUSTMENT TARGET IS DEVICE LINK PROFILE<br><br>$cmyk_p = f_{icc}(DLProfile, A2B0, Input)$ |
| (b-1) USE PROFILES IN COMBINATION: ADJUSTMENT TARGET IS INPUT PROFILE<br><br>$cmyk_p = f_{icc}(OutputProfile, B2A, f_{icc}(InputProfile, A2B, Input))$ |
| (b-2) USE PROFILES IN COMBINATION: ADJUSTMENT TARGET IS OUTPUT PROFILE<br><br>$cmyk_p = f_{icc}(OutputProfile, B2A, f_{icc}(InputProfile, A2B, Input))$ |

WHERE
InputProfile REPRESENTS INPUT PROFILE;
OutputProfile REPRESENTS OUTPUT PROFILE;
DLProfile REPRESENTS DEVICE LINK PROFILE;
$f_{icc}$ REPRESENTS COLOR CONVERSION BY ICC PROFILE;
FIRST ARGUMENT IS PROFILE NAME;
A2B OF SECOND ARGUMENT IS CONVERSION FROM DEVICE COLORS TO DEVICE-INDEPENDENT COLORS;
B2A OF SECOND ARGUMENT IS CONVERSION FROM DEVICE-INDEPENDENT COLORS TO DEVICE COLORS;
A2B0 OF SECOND ARGUMENT IS CONVERSION BY DEVICE LINK TABLE; AND
THIRD ARGUMENT REPRESENTS INPUT VALUES AT ADJUSTMENT POINT (CMYK, RGB, Lab, ETC.)

Fig. 13

(b-1) INPUT/OUTPUT PROFILES COMBINED AND INPUT PROFILE DESIGNATED (b-2) INPUT/OUTPUT PROFILES COMBINED AND OUTPUT PROFILE DESIGNATED (a-2) USE PROFILE ALONE: ADJUSTMENT TARGET IS OUTPUT PROFILE

Input_P = Input
TargetOut_P = TargetOut (a-3) USE PROFILE ALONE: ADJUSTMENT TARGET IS DEVICE LINK PROFILE (SAME AS (a-2))

(b-1) USE PROFILES IN COMBINATION: ADJUSTMENT TARGET IS INPUT PROFILE

Input_P = Input
TargetOut_P = $f_{icc}$(OutputProfile, A2B, TargetOut)

(b-2) USE PROFILES IN COMBINATION: ADJUSTMENT TARGET IS OUTPUT PROFILE

Input_P = $f_{icc}$(InputProfile, A2B, Input)
TargetOut_P = TargetOut

Fig. 15

PROFILE ADJUSTMENT METHOD, PROFILE ADJUSTMENT APPARATUS, AND PROFILE ADJUSTMENT SYSTEM

BACKGROUND

1. Technical Field

The invention relates to a technique for adjusting a profile used in conversion of coordinate values in a color space.

2. Related Art

When using an ink jet printer for calibration applications of printing such as offset printing, an extremely high level of color reproduction accuracy (a degree to which colors are accurately reproduced) is required. A color management system using an International Color Consortium (ICC) profile is one system for accomplishing this. The ICC profile is data expressing a correspondence relationship between device-dependent colors of a color device such as a printing press (for example, an offset printer) or an ink jet printer, and device-independent colors. The device-dependent colors of the printing press, the ink jet printer, and the like are expressed as coordinate values in a device-dependent color space, for example, as CMYK values expressing usage amounts of C (cyan), M (magenta), Y (yellow), and K (black). The device-independent colors are expressed as, for example, color values in the International Commission on Illumination (CIE) L*a*b* color space (abbreviated as Lab values, omitting the "*"), color values in a CIE XYZ color space, and the like, which are device-independent color spaces.

Here, the ICC profile of the printing press is assumed as an input profile and the ICC profile of the ink jet printer is assumed as an output profile. When the CMYK values of the printing press are converted into color values (for example, Lab values) in a Profile Connection Space (PCS) in accordance with the input profile, the color values can be converted into CMYK values of the ink jet printer (called $CMYK_p$ values) in accordance with the output profile. When the ink jet printer performs printing using the $CMYK_p$ values, the ink jet printer can reproduce colors close to the colors of the printing press. In practice, however, there are cases where expected colors cannot be reproduced due to profile error, color measurement error, fluctuations in the printer, and the like. In such a case, spot color adjustment is carried out, where an adjustment point expressing a spot color to be adjusted is designated, an adjustment target of the adjustment point is designated, and the ICC profile is modified based on the adjustment target.

In a case of using a colorimetric device, when a color chart containing a spot color patch is printed by the ink jet printer, and the formed spot color patch is measured by the colorimetric device, a colorimetric value (PCS value) before adjustment can be obtained. Additionally, when a color chart containing the spot color patch is printed by the printing press, and the formed spot color patch is measured, a target colorimetric value can be obtained. In this case, it is conceivable to feed back the adjustment target into the ICC profile using coordinates in PCS as a reference.

JP-A-2005-348210 discloses a technique, which is not spot color adjustment, for determining correction information for correcting color output characteristics of a second color output apparatus to color output characteristics of a first color output apparatus. According to this technique, first, CMYK values of first evaluation data are converted into a plurality of pieces of second evaluation data respectively in accordance with a plurality of pieces of correction information. The correction information achieving the lowest difference in color output characteristics between the first color output apparatus, which performs output using the first evaluation data, and the second color output apparatus, which performs output using the second evaluation data, is then selected.

When feeding back the adjustment target into the ICC profile using coordinates in PCS as a reference, the color of material printed by the ink jet printer (as numerical values, the colorimetric values) may not match the intended adjustment result.

Note that this issue is not limited to the adjustment of profiles suitable for ink jet printers, and also arises when adjusting the profiles suitable for a variety of color devices.

SUMMARY

An advantage of the invention is to provide a technique capable of improving color reproduction accuracy of a profile used in conversion of coordinate values in a color space.

To achieve one of the above-described advantages, the invention has as one aspect a profile adjustment method that carries out, by a computer, a process of adjusting an adjustment target profile among a plurality of profiles including an input profile expressing a correspondence relationship between first coordinate values in a first device-dependent color space and device-independent coordinate values in a profile connection space and an output profile expressing a correspondence relationship between the device-independent coordinate values and second coordinate values in a second device-dependent color space, the profile adjustment method including:

the output profile including a first conversion table for converting the device-independent coordinate values into the second coordinate values and a second conversion table for converting the second coordinate values into the device-independent coordinate values, receiving an adjustment target at an adjustment point, using coordinates in a profile connection space as a reference, converting the device-independent coordinate values at the adjustment point into the second coordinate values in accordance with the first conversion table, and converting the second coordinate values into adjustment target PCS values as the device-independent coordinate values, in accordance with the second conversion table, when values obtained by adding relative values of the adjustment target using the coordinates in the profile connection space as a reference to the adjustment target PCS values are assumed as target PCS values, the second coordinate values at the adjustment point are assumed as adjustment target color values, and values added to the adjustment target color values are assumed as adjustment color values, obtaining an optimal solution of the adjustment color values through an optimization process including an element that brings provisional PCS values, obtained by converting, according to the second conversion table, provisional color values obtained by adding the adjustment color values to the adjustment target color values, closer to the target PCS values, and adjusting the adjustment target profile based on the optimal solution of the adjustment color values.

Additionally, the invention has as another aspect a profile adjustment program that causes a computer to execute functions corresponding to the steps of the above-described profile adjustment method.

Furthermore, the invention has as another aspect a profile adjustment apparatus including units corresponding to the steps of the above-described profile adjustment method.

Further still, the invention has as another aspect a profile adjustment system including units corresponding to the steps of the above-described profile adjustment method.

The above-described aspects can provide a profile adjustment method that improves the color reproduction accuracy of the profile used to convert the coordinate values in the color space.

BRIEF DESCRIPTION OF THE DRAWINGS

The invention will be described with reference to the accompanying drawings, wherein like numbers reference like elements.

FIG. 13 is a diagram schematically illustrating an example of equations for calculating the current output values.

FIG. 15 is a diagram schematically illustrating examples of equations for calculating the input values and the adjustment target values of the adjustment target profile.

DESCRIPTION OF EXEMPLARY EMBODIMENTS

Figure 1:
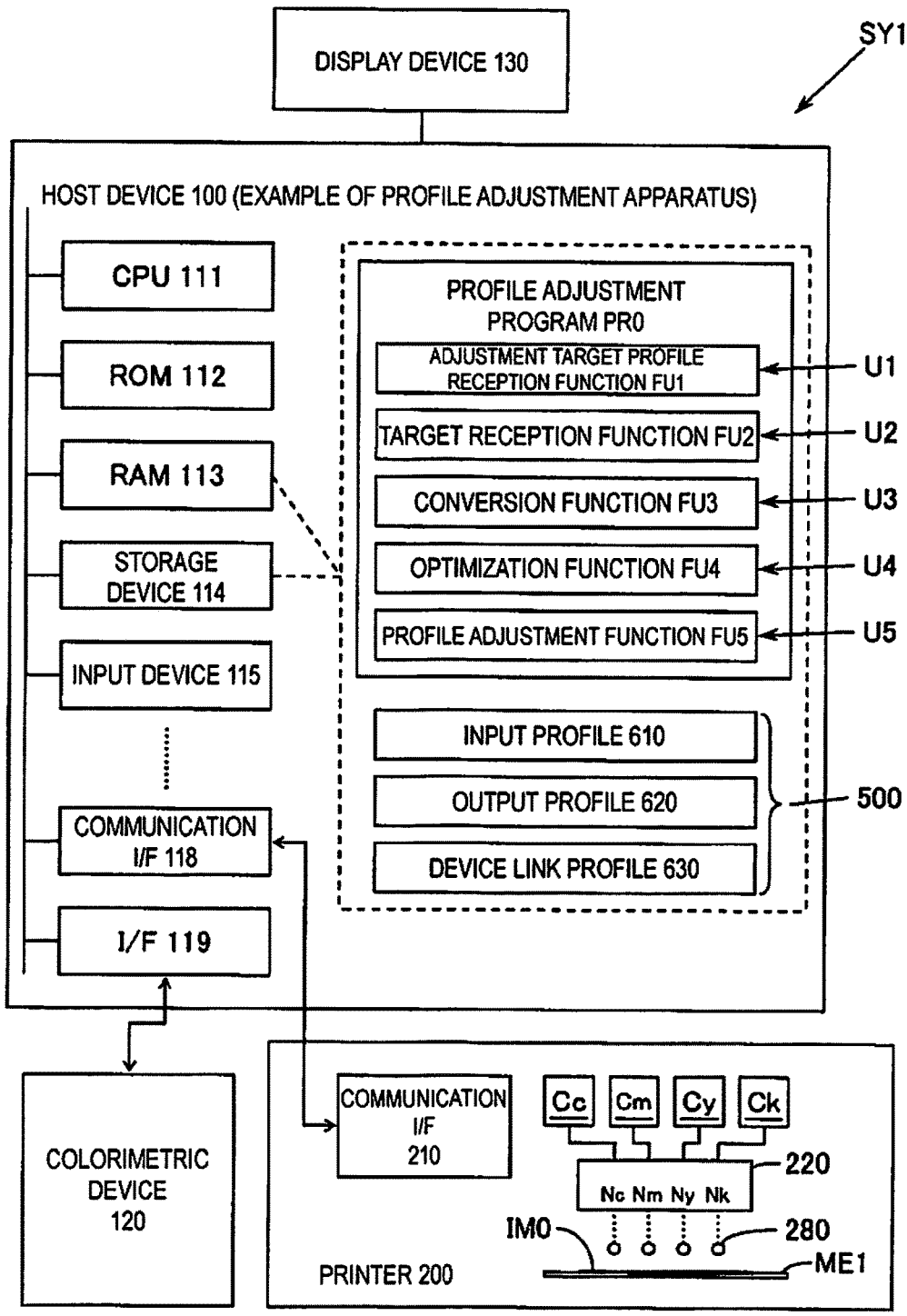
FIG. 1 is a block diagram schematically illustrating an example of the configuration of a profile adjustment system.

Exemplary embodiments of the invention will be described hereinafter. Of course, the following exemplary embodiments are merely examples of the invention and not all of the characteristics described in the exemplary embodiments are required to address the issue discussed in the disclosure.

1. OVERVIEW OF TECHNIQUE DESCRIBED IN INVENTION

First, an overview of the technique described in the invention will be given with reference to the examples illustrated in FIGS. 1 to 17. Note that the drawings in this application are drawings schematically illustrating examples. The scales in the directions indicated in the drawings may differ, and the drawings may not match with each other. Of course, elements according to this technique are not limited to specific examples indicated by reference signs.

Aspect 1

As illustrated in FIGS. 2, 6 to 10, and the like, a profile adjustment method according to one aspect of this technique is a profile adjustment method in which processing for adjusting an adjustment target profile 550 is carried out by a computer (for example, a host device 100), and includes a target reception step ST2, a conversion step ST3, an optimization step ST4, and a profile adjustment step ST5. Here, the adjustment target profile 550 is one of a plurality of profiles 500 including an input profile 610 and an output profile 620. The input profile 610 expresses a correspondence relationship between first coordinate values (for example, CMYK values) in a first device-dependent color space CS1 (for example, the CMYK color space) and device-independent coordinate values (for example, Lab values) in a profile connection space CS3 (for example, the Lab color space). The output profile 620 expresses a correspondence relationship between the device-independent coordinate values (for example, Lab values) and second coordinate values (for example, cmyk values) in a second device-dependent color space CS2 (for example, the cmyk color space). The output profile 620 includes a first conversion table (for example, a B2A table 621) for converting the device-independent coordinate values (for example, the Lab values) into the second coordinate values (for example, the cmyk values), and a second conversion table (for example, an A2B table 622) for converting the second coordinate values (for example, the cmyk values) into the device-independent coordinate values (for example, the Lab values).

In the target reception step ST2, an adjustment target T0 at an adjustment point P0, which uses coordinates in the profile connection space CS3 as a reference, is received. In the conversion step ST3, the device-independent coordinate values at the adjustment point P0 (for example, $Lab_{S1}$) are converted into the second coordinate values (for example, $cmyk_p$) in accordance with the first conversion table (621), and the second coordinate values are then converted into adjustment target PCS values (for example, $Lab_{S2}$) as device-independent coordinate values, in accordance with the second conversion table (622).

Here, values obtained by adding relative values of the adjustment target T0 using the coordinates in the profile connection space CS3 as a reference (for example, $\Delta Lab_{T-p}$) to the adjustment target PCS values ($Lab_{S2}$) are assumed as target PCS values (for example, $Lab_{ST}$). Additionally, the second coordinate values at the adjustment point P0 are assumed as adjustment target color values ($cmyk_p$). Furthermore, values added to the adjustment target color values ($cmyk_p$) for matching the adjustment target T0 are assumed as adjustment color values (for example, $\Delta cmyk$). In the optimization step ST4, an optimal solution (for example, $\Delta cmyk_b$) of the adjustment color values ($\Delta cmyk$) is obtained through an optimization process including an element that brings provisional PCS values (for example, $Lab_{S3}$), obtained by converting, according to the second conversion table (622), provisional color values (for example, $cmyk_{pp}$) obtained by adding the adjustment color values ($\Delta cmyk$) to the adjustment target color values ($cmyk_p$), closer to the target PCS values ($Lab_{ST}$). In the profile adjustment step ST5, the adjustment target profile 550 is adjusted based on the optimal solution ($\Delta cmyk_b$) of the adjustment color values ($\Delta cmyk$).

In the above-described conversion step ST3, the second coordinate values ($cmyk_p$) obtained from the device-independent coordinate values ($Lab_{S1}$) at the adjustment point P0 in accordance with the first conversion table (621) of the output profile 620 express output colors of a second device (for example, a printer 200) having the second device-dependent color space CS2. The adjustment target PCS values ($Lab_{S2}$) obtained from the second coordinate values ($cmyk_p$) in accordance with the second conversion table (622) of the output profile 620 are device-independent coordinate values expressing the output colors of the second device (200). Values obtained by adding the relative values ($\Delta Lab_{T-p}$) of the adjustment target T0 using the coordinates in the profile connection space CS3 as a reference to the adjustment target PCS values ($Lab_{S2}$) are the target PCS values ($Lab_{ST}$). According to this aspect, the adjustment target profile 550 is adjusted based on the optimal solution ($\Delta cmyk_b$) of the adjustment color values ($\Delta cmyk$) obtained through the optimization process, which includes an element that brings the provisional PCS values ($Lab_{S3}$) closer to the target PCS values ($Lab_{ST}$), and thus an adjustment result with respect to the output colors of the second device (200) is closer to an intended color.

Accordingly, this aspect provides a profile adjustment method that improves the color reproduction accuracy of a profile used to convert the coordinate values in a color space.

Here, the profile connection space includes color spaces such as the CIE Lab color space, the CIE XYZ color space, and the like.

The first device-dependent color space includes the CMYK color space, the CMY color space, the RGB color space, and the like. Note that R stands for red, G for green, and B for blue.

The second device-dependent color space includes the CMYK color space, the CMY color space, the RGB color space, and the like. In the exemplary embodiments described below, when the second device-dependent color space is the CMYK color space, the second device-dependent color space will be referred to as a cmyk color space to distinguish the color space from the CMYK color space corresponding to the first device-dependent color space.

The plurality of profiles that can be adjustment target profiles may be two types, that is, the input profile and the output profile, or may further include a device link profile.

The adjustment target at the adjustment point may be expressed as coordinate values in a color space, or may be expressed as a difference from current coordinate values in the color space.

An optimization process using a quasi-Newton method, an optimization process using a Newton method, an optimization process using a conjugate gradient method, and the like can be used as the optimization process.

Obtaining an optimal solution through an optimization process includes determining an optimal solution from among a plurality of solutions obtained by carrying out a plurality of optimization processes, and obtaining an optimal solution from a single optimization process.

Note that the additional remarks made above in Aspect 1 also apply to the other aspects.

Aspect 2

Figure 2:
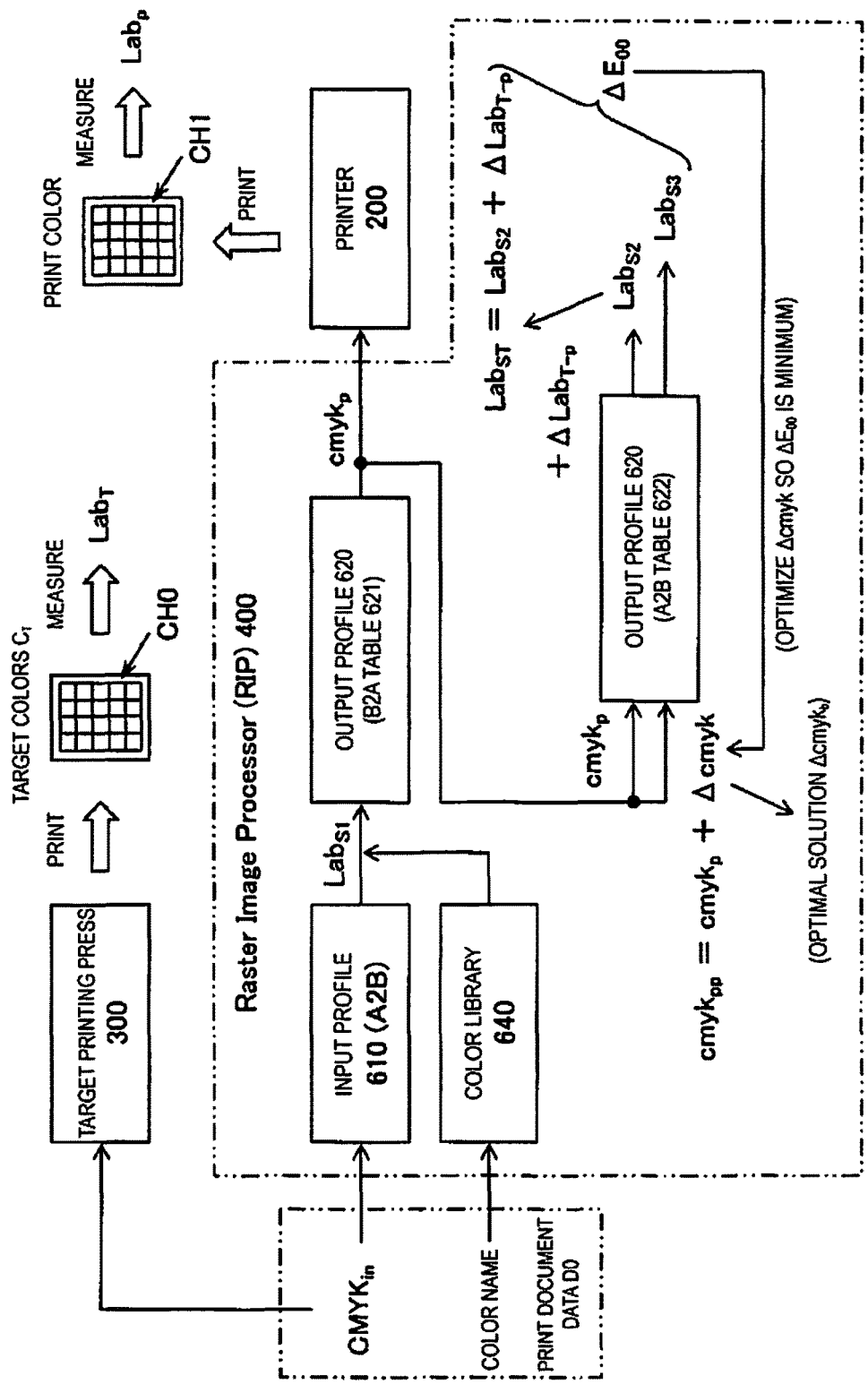
FIG. 2 is a diagram schematically illustrating an example of a color management flow.
Figure 6:
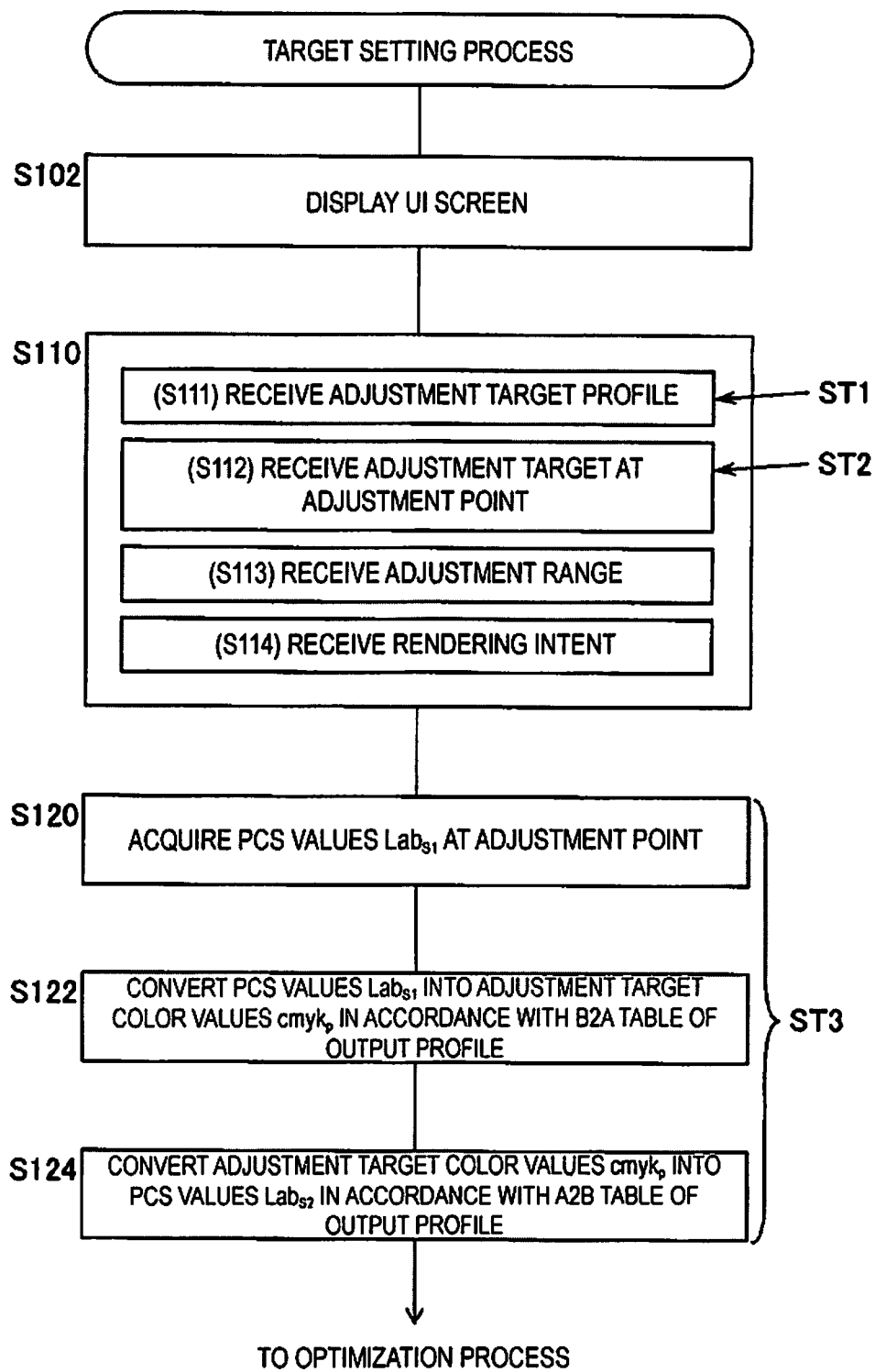
FIG. 6 is a flowchart illustrating an example of a target setting process.

As illustrated in FIGS. 2 and 6, in the conversion step ST3, the first coordinate values (for example, $CMYK_{in}$) at the adjustment point P0 may be converted into the device-independent coordinate values ($Lab_{S1}$) in accordance with the input profile 610, the device-independent coordinate values may be converted into the second coordinate values ($cmyk_p$) in accordance with the first conversion table (621), and the second coordinate values may be converted into the adjustment target PCS values ($Lab_{S2}$) in accordance with the second conversion table (622). This aspect can provide a technique favorable when the adjustment points use coordinates in the first device-dependent color space as a reference.

Aspect 3

Figure 8:
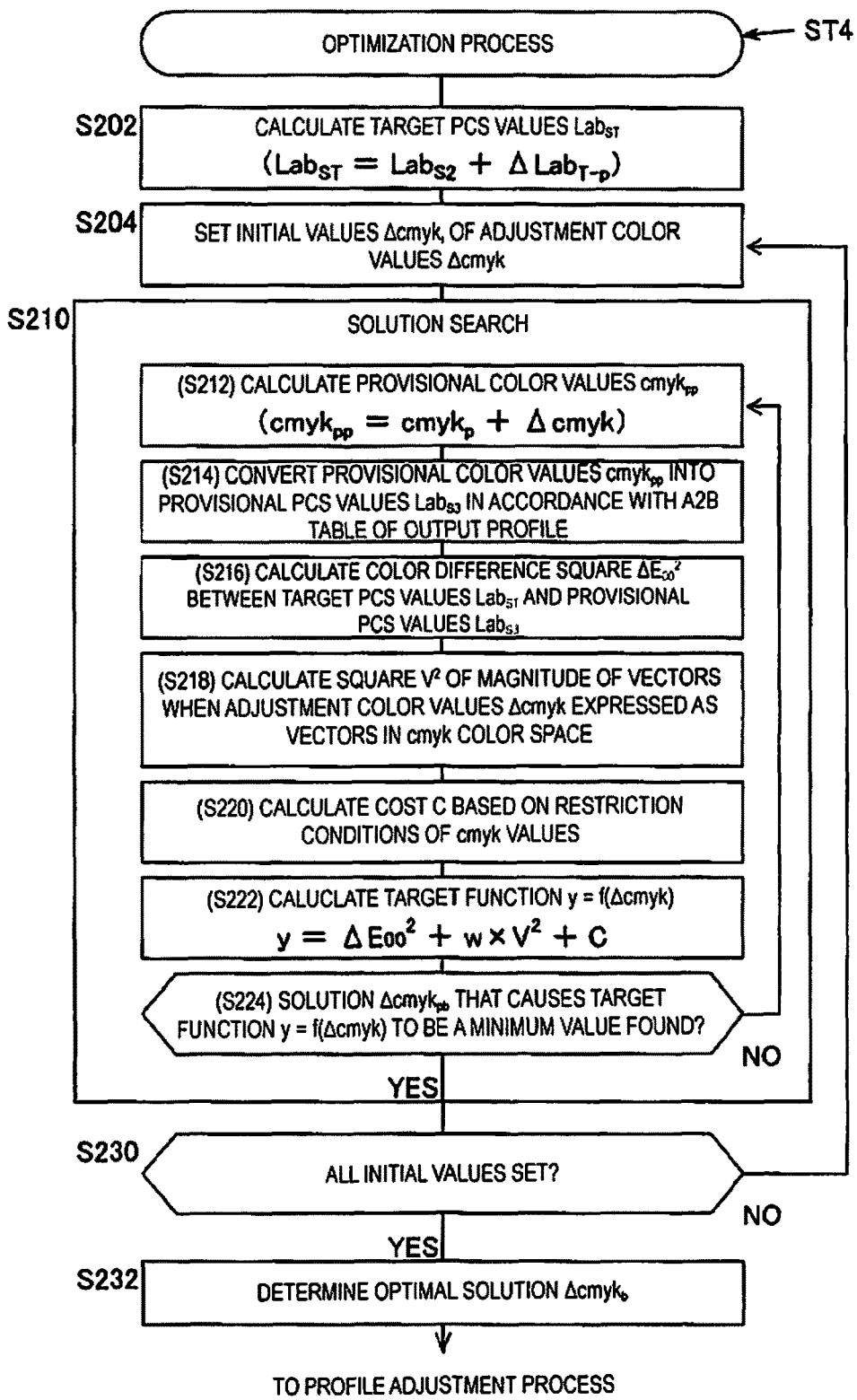
FIG. 8 is a flowchart illustrating an example of an optimization process.

As illustrated in FIG. 8, in the optimization step ST4, the optimal solution ($\Delta cmyk_b$) may be obtained through the optimization process using a target function (for example, $y=f(\Delta cmyk)$ including a square of a color difference (for example, $\Delta E_{00}$) between the provisional PCS values ($Lab_{S3}$) and the target PCS values ($Lab_{ST}$)). Note that when the output values of the target function decrease as the square of the color difference decreases, the element that brings the provisional PCS values ($Lab_{S3}$) closer to the target PCS values ($Lab_{ST}$) refers to reducing the output values of the target function. With this aspect, the square root included in the color difference does not have to be calculated, thus the optimization process can be accelerated.

Here, the color difference includes the color difference $\Delta E_{00}$ expressed by the CIEDE 2000 color difference type, a color difference $\Delta E^*_{94}$ expressed by the CIE 1994 color difference type, a color difference $\Delta E^*_{ab}$ according to the CIE L*a*b* color system proposed in 1976 (also known as $\Delta E^*_{76}$), a color difference $\Delta E^*_{uv}$ according to the CIE L*u*v* color system, and the like.

Although not included in Aspect 3, a case where the square root included in the color difference is calculated is also included in this technique.

Aspect 4

As illustrated in FIG. 8, in the optimization step ST4, the optimal solution ($\Delta cmyk_b$) may be obtained through the optimization process using a target function ($y=f(\Delta cmyk)$) including a color difference ($\Delta E_{00}$) between the provisional PCS values ($Lab_{S3}$) and the target PCS values ($Lab_{ST}$), and including, in addition to the color difference ($\Delta E_{00}$), a magnitude (for example, V) of vectors when the adjustment color values ($\Delta cmyk$) are expressed as the vectors in the second device-dependent color space CS2. By including, in the target function ($y=f(\Delta cmyk)$), the magnitude (V) of the vectors when the adjustment color values ($\Delta cmyk$) are expressed as the vectors in the second device-dependent color space CS2 in addition to the color difference ($\Delta E_{00}$)

between the provisional PCS values ($Lab_{S3}$) and the target PCS values ($Lab_{ST}$), a situation where absolute values of given components (for example, $\Delta c$, $\Delta m$, $\Delta y$, or $\Delta k$) of the adjustment color values ($\Delta cmyk$) are prominently greater is suppressed. Accordingly, this aspect can provide a technique that further improves the color reproduction accuracy of the adjustment target profile.

Although not included in Aspect 4, a case where the magnitude of the vectors of the adjustment color values is not included in the target function is also included in this technique.

Aspect 5

As illustrated in FIG. 8, in the optimization step ST4, the optimal solution ($\Delta cmyk_b$) may be obtained through the optimization process by applying a range (for example, from 0 to 100) that the second coordinate values can take on to restriction conditions of a range of the provisional color values ($cmyk_{pp}$). Adjustment cannot be carried out when the provisional color values ($cmyk_{pp}$) exceed the range that the second coordinate values can take on, and thus this aspect provides a favorable optimization process.

In this application, "from Min to Max" means greater than or equal to a minimum value Min and less than or equal to a maximum value Max.

Although not included in Aspect 5, a case where the above-described restriction conditions are not present is also included in this technique.

Aspect 6

Figure 9:
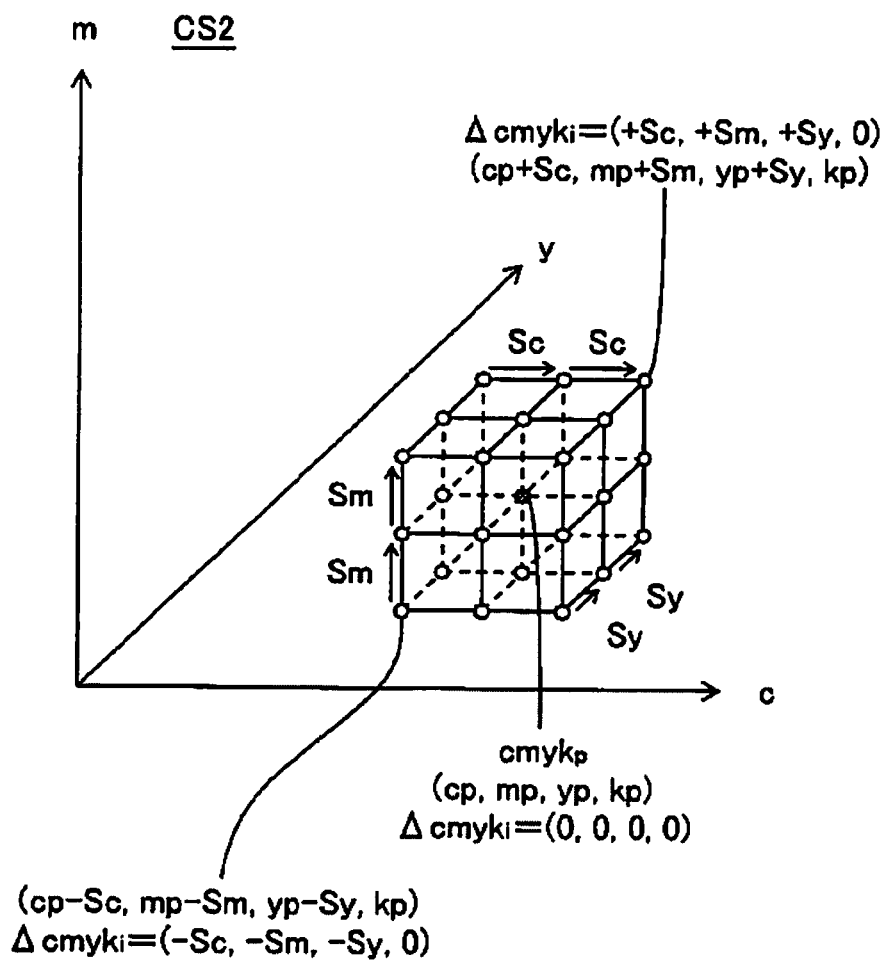
FIG. 9 is a diagram schematically illustrating an example of changing initial values of adjustment color values.

As illustrated in FIGS. 8 and 9, in the optimization step ST4, a plurality of initial values (for example, $\Delta cmyk_i$) of the adjustment color values ($\Delta cmyk$) may be used in the optimization process. In the optimization step ST4, a plurality of optimal solution candidates (for example, $\Delta cmyk_{pb}$) of the adjustment color values ($\Delta cmyk$) may be obtained by carrying out the optimization process using the target function ($y=f(\Delta cmyk)$) on the respective plurality of initial values ($\Delta cmyk_i$). In the optimization step ST4, the optimal solution ($\Delta cmyk_b$) may be obtained based on the plurality of optimal solution candidates ($\Delta cmyk_{pb}$). Although the target function ($y=f(\Delta cmyk)$) can have a plurality of minimum value or a plurality of maximum values, a more desirable solution can be obtained by using the plurality of initial values ($\Delta cmyk_i$) of the adjustment color values ($\Delta cmyk$). Accordingly, this aspect can provide a favorable optimization process.

Although not included in Aspect 6, the adjustment color values having a single initial value is also included in this technique.

Aspect 7

Figure 7:
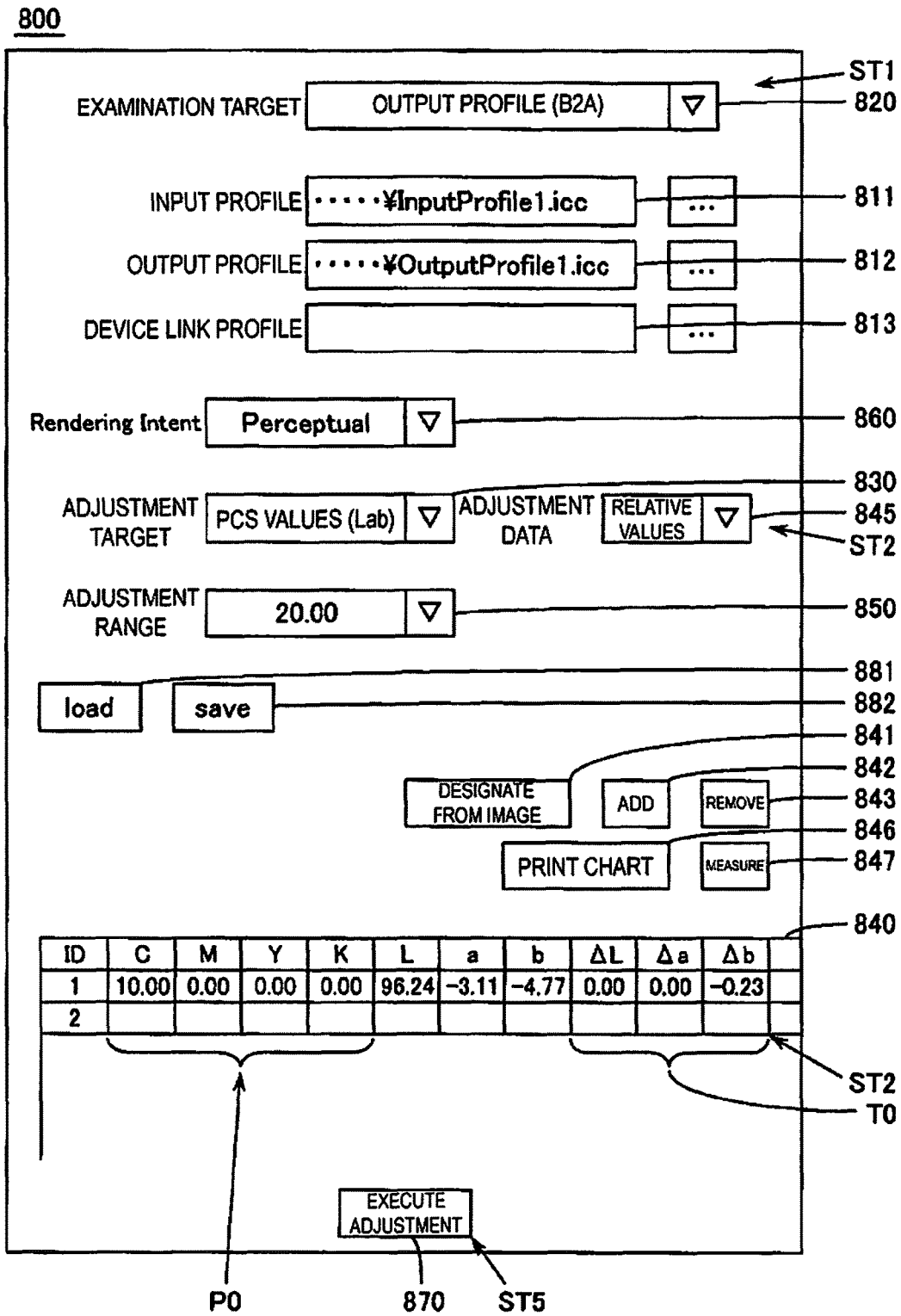
FIG. 7 is a diagram schematically illustrating an example of a user interface screen.

As illustrated in FIGS. 6 and 7, the profile adjustment method may further include an adjustment target profile reception step ST1 of receiving one profile among the plurality of profiles 500 as the adjustment target profile 550. According to this aspect, the adjustment target profile 550 can be selected from the plurality of profiles 500 including the input profile 610 and the output profile 620, and thus a technique that improves the convenience of operations for adjusting the profiles can be provided.

Aspect 8

Incidentally, a profile adjustment program PR0 according to one aspect of this technique causes a computer (for example, a host device 100) to implement a target reception function FU2 corresponding to the target reception step ST2, a conversion function FU3 corresponding to the conversion step ST3, an optimization function FU4 corresponding to the optimization step ST4, and a profile adjustment function FU5 corresponding to the profile adjustment step ST5. Accordingly, this aspect provides a profile adjustment program that improves the color reproduction accuracy of a profile used to convert the coordinate values in a color space. The profile adjustment program PR0 may cause the computer (for example, the host device 100) to implement an adjustment target profile reception function FU1 corresponding to the adjustment target profile reception step ST1.

Aspect 9

A profile adjustment apparatus (for example, the host device 100) according to an aspect of this technique includes a target reception unit U2 corresponding to the target reception step ST2, a conversion unit U3 corresponding to the conversion step ST3, an optimization unit U4 corresponding to the optimization step ST4, and a profile adjustment unit U5 corresponding to the profile adjustment step ST5. Accordingly, this aspect provides a profile adjustment apparatus that improves the color reproduction accuracy of a profile used to convert the coordinate values in a color space. The profile adjustment apparatus (100) may include an adjustment target profile reception unit U1 corresponding to the adjustment target profile reception step ST1.

Aspect 10

Furthermore, a profile adjustment system SY1 according to an aspect of this technique includes a printing device (for example, a printer 200) configured to print a color chart including a patch, a colorimetric device 120 configured to measure the patch, and the units of Aspect 9. Accordingly, this aspect provides a profile adjustment system that improves the color reproduction accuracy of a profile used to convert the coordinate values in a color space. This profile adjustment system SY1 may include the adjustment target profile reception unit U1.

This technique can furthermore be applied in a control method of a profile adjustment apparatus, a multifunction system including a profile adjustment apparatus, a control method of a multifunction system, a control program of a profile adjustment apparatus, a control program of a multifunction system, a computer-readable medium in which is recorded a profile adjustment program, and the control program, and the like. The above-described apparatuses may include a plurality of separate parts.

2. SPECIFIC EXAMPLE OF CONFIGURATION OF PROFILE ADJUSTMENT SYSTEM

FIG. 1 schematically illustrates an example of the configuration of a profile adjustment system including a profile adjustment apparatus. The profile adjustment system SY1 illustrated in FIG. 1 includes the host device 100 (an example of a profile adjustment apparatus), a display device 130, the colorimetric device 120, and the ink jet printer 200. In the host device 100, a central processing unit (CPU) 111, read-only memory (ROM) 112, random access memory (RAM) 113, a storage device 114, an input device 115, a communication interface (I/F) 118, a colorimetric device I/F 119, and the like are connected so as to be capable of inputting/outputting information to/from each other. Note that the ROM 112, the RAM 113, and the storage device 114 are memory, and at least the ROM 112 and the RAM 113 are semiconductor memory. A liquid-crystal display panel and the like can be used as the display device 130.

The storage device 114 stores an operating system (OS; not illustrated), a profile adjustment program PR0, and the like. These may be loaded into the RAM 113 and used in the processing for adjusting the profiles 500. Here, "profiles 500" collectively refers to the input profile 610, the output profile 620, and a device link profile 630. Various types of information, for example, the input profile 610, the output profile 620, the device link profile 630, an adjustment history (not illustrated), and the like, are stored in at least one of the RAM 113 and the storage device 114. Non-volatile semiconductor memory such as flash memory, a magnetic storage device such as a hard disk, and the like can be used as the storage device 114.

A pointing device, hardware keys including a keyboard, a touch panel affixed to a surface of a display panel, and the like can be used as the input device 115. The communication I/F 118 is connected to a communication I/F 210 of the printer 200, and inputs/outputs information such as print data to/from the printer 200. The colorimetric device I/F 119 is connected to the colorimetric device 120, and obtains colorimetric data, including colorimetric values, from the colorimetric device 120. Universal Serial Bus (USB), a near-field wireless communication standard, and the like can be used as the standard of the I/Fs 118, 119, and 210. The communication by the communication I/Fs 118, 119, and 210 may be hard-wired, may be wireless, or may be network communication over a local area network (LAN), the internet, and the like.

The colorimetric device 120 can measure respective color patches formed on a print substrate, which is an example of a medium on which a color chart is formed, and output colorimetric values. The patch is also called a "color chart". The colorimetric values are values expressed as a lightness L and color component coordinates a and b in the CIE Lab color space, for example. The host device 100 obtains the colorimetric data from the colorimetric device 120 and carries out various processes.

The profile adjustment program PR0 illustrated in FIG. 1 causes the host device 100 to implement an adjustment target profile reception function FU1, a target reception function FU2, a conversion function FU3, an optimization function FU4, and a profile adjustment function FU5.

The CPU 111 of the host device 100 carries out various processes by reading out information stored in the storage device 114 into the RAM 113 and executing the read-out programs as appropriate. The CPU 111 carries out processes corresponding to the aforementioned functions FU1 to FU5 by executing the profile adjustment program PR0 read out into the RAM 113. The profile adjustment program PR0 causes the host device 100, which is a computer, to function as the adjustment target profile reception unit U1, the target reception unit U2, the conversion unit U3, the optimization unit U4, and the profile adjustment unit U5. Additionally, the host device 100 executing the profile adjustment program PR0 carries out the adjustment target profile reception step ST1, the target reception step ST2, the conversion step ST3, the optimization step ST4, and the profile adjustment step ST5. A computer-readable medium storing the profile adjustment program PR0 that causes a computer to implement the aforementioned functions FU1 to FU5 is not limited to a storage device within the host device, and may be a recording medium external to the host device.

Note that the host device 100 includes computers such as personal computers (including tablet-type terminals). For example, when a main unit of a desktop-type personal computer is employed as the host device 100, the display device 130, the colorimetric device 120, and the printer 200 are normally connected to that main unit. When a computer with an integrated display device, such as a laptop-type personal computer, is employed as the host device 100, the colorimetric device 120 and the printer 200 are normally connected to that computer. Even in a case where the host device includes an integrated display device, display data is still output to that internal display device. Additionally, the host device 100 may include all of the constituent elements 111 to 119 within a single housing, or may include a plurality of separate devices that can communicate with each other. Furthermore, this technique can be implemented even in a case where at least one of the display device 130, the colorimetric device 120, and the printer 200 is provided in the host device 100.

The printer 200 illustrated in FIG. 1 (an example of an output device) is assumed to be an ink jet printer that forms an output image IMO corresponding to print data by ejecting (discharging) C (cyan) ink, M (magenta) ink, Y (yellow) ink, and K (black) ink, serving as color materials, from a recording head 220. The recording head 220 is supplied with CMYK (cyan, magenta, yellow, and black) inks from ink cartridges Cc, Cm, Cy, and Ck, respectively, and ejects CMYK ink droplets 280 from nozzles Nc, Nm, Ny, and Nk, respectively. When the ink droplets 280 land upon a print substrate ME1, ink dots are formed on the print substrate ME1. A printed material having the output image IMO on the print substrate ME1 is obtained as a result.

3. SPECIFIC EXAMPLE OF COLOR MANAGEMENT SYSTEM

Next, an example of a color management system in which this technique can be applied will be described with reference to FIG. 2.

The color management system illustrated in FIG. 2 uses a Raster Image Processor (RIP) 400 implemented by the above-described host device 100, for example, to convert print document data D0 into output data expressing print colors $cmyk_p$ (cyan, magenta, yellow, and black), and cause the ink jet printer 200 to form a printed material. The print document data D0 expresses process colors $CMYK_{in}$ for reproducing colors serving as targets (target colors $C_T$) for CMYK inks (color materials) of a target printing press 300, which is an example of a target device for color matching. Color names of a color library can also be designated in the print document data D0. For example, the Pantone (registered trademark) color library and the like can be used as the color library.

Although the target printing press 300 assumes an offset printing press, the target printing press 300 may be a gravure printing press, a flexography printing press, and the like. The target colors $C_T$ are expressed, for example, by the coordinate values (Lab values) in CIE Lab color space. FIG. 2 illustrates a situation in which the target printing press 300 prints a color chart CH0 expressing the target colors $C_T$ onto a print substrate, and the colorimetric device acquires colorimetric values $Lab_T$ by measuring the respective patches in the color chart CH0. The process colors $CMYK_{in}$ correspond to usage amounts of the CMYK inks used by the target printing press 300, and express CMYK color space coordinates dependent on the target printing press 300.

The RIP 400 illustrated in FIG. 2 includes the input profile 610, the output profile 620, and a color library 640. The input profile 610 is a file denoting color characteristics of the ink used by the target printing press 300. The output profile 620 is a file denoting color characteristics of the ink used by the ink jet printer 200. An ICC profile data format, for example, can be used for both of the profiles 610 and 620. The process colors $CMYK_{in}$ of the print document data D0 are converted into Lab color space colors $Lab_{S1}$ in accordance with an A2B table of the input profile 610, and are converted into the print colors $cmyk_p$ in accordance with the B2A table 621 (an example of the first conversion table) of the output profile 620. When the printer 200 uses a total of four CMYK color inks, the print colors $cmyk_p$ are output by the printer 200 and reproduced on a printed material. FIG. 2 illustrates a situation in which the printer 200 prints a color chart CH1 expressing the print colors $cmyk_p$ onto a print substrate, and the colorimetric device 120 acquires the colorimetric values $Lab_p$ by measuring the respective patches in the color chart CH1. When the printer 200 also uses inks such as Lc (light cyan), Lm (light magenta), Dy (dark yellow), Lk (light black), and the RIP 400 or the printer 200 classifies the print colors $cmyk_p$ into dark colors and light colors, the printer 200 can reproduce the print colors cmykp in the printed material. Of course, the print colors themselves are not limited to a total of four CMYK colors.

Furthermore, when color names are set in the print document data D0, the RIP 400 can convert the color names into the Lab color space colors $Lab_{S1}$ by referring to the color library 640.

Note that in addition to the process colors $CMYK_{in}$, the RIP 400 also includes input profile for converting process colors expressing usage amounts of the color materials of only three primary colors CMY, which is a subtractive color mixture ($CMY_{in}$), process colors expressing intensities of three primary colors R (red), G (green), and B (blue), which is an additive color mixture ($RGB_{in}$), and the like, and the coordinate values in the Lab color space. Accordingly, the RIP 400 can also convert process colors $CMY_{in}$, process colors $RGB_{in}$, and the like into the print colors $cmyk_p$ through the Lab color space. Additionally, the RIP 400 can also input the Lab color space colors $Lab_{S1}$ and convert the colors to the print colors $cmyk_p$.

Through the foregoing, the ink jet printer 200 can reproduce colors close to the colors of the target printing press 300. In practice, however, there are cases where the expected colors cannot be reproduced, due to profile error, color measurement error, fluctuations in the printer, and the like. In such a case, the conversion accuracy of the target colors is increased by modifying the profiles 610 and 620. When modifying the output profile 620, it is conceivable to take the $Lab_{S1}$ values in a profile connection space (PCS) as target values, take the results of measuring colors printed by the printer 200 ($Lab_p$) as current values, calculate a color difference between the two, and modify the output profile 620 so as to reduce that color difference. Additionally, when modifying the input profile 610, it is conceivable to convert color chart data with the input profile 610 and the output profile 620 and print the color charts, calculate a color difference between the measurement results of the respective patches ($Lab_p$) and the target color values ($Lab_T$), and modify the input profile 610 so as to reduce that color difference.

However, when feeding back the adjustment targets into the adjustment target profile, with the PCS coordinates serving as a reference, there are situations where the colors of the printed material from the printer 200 (as numerical values, the colorimetric values $Lab_p$) do not provide the intended adjustment result. One reason for this is that colors adjusted in the PCS sometimes become colors out of the color reproduction range of the output profile 620 and are mapped to the color reproduction range. Additionally, there are cases where even in a case where the colors adjusted in the PCS are in the color reproduction range of the output profile 620, error dependent on the accuracy of the B2A table 621 of the output profile 620 arises. This can also result in the intended adjustment result not being obtained.

In this specific example, the color reproduction accuracy of a post-adjustment profile is improved by using the A2B table 622 (an example of a second conversion table) of the output profile 620. FIG. 2 illustrates optimizing adjustment color values $\Delta cmyk$ of the print colors $cmyk_p$ so as to become closest to the target PCS values $Lab_{ST}$ obtained by adding adjustment amounts (relative values) $\Delta Lab_{T-p}$ to simulation color values $Lab_{S2}$ obtained from the print colors $cmyk_p$. The optimized adjustment color values $\Delta cmyk$ are used to adjust the adjustment target profile.

4. SPECIFIC EXAMPLES OF PROFILES

Figure 3:
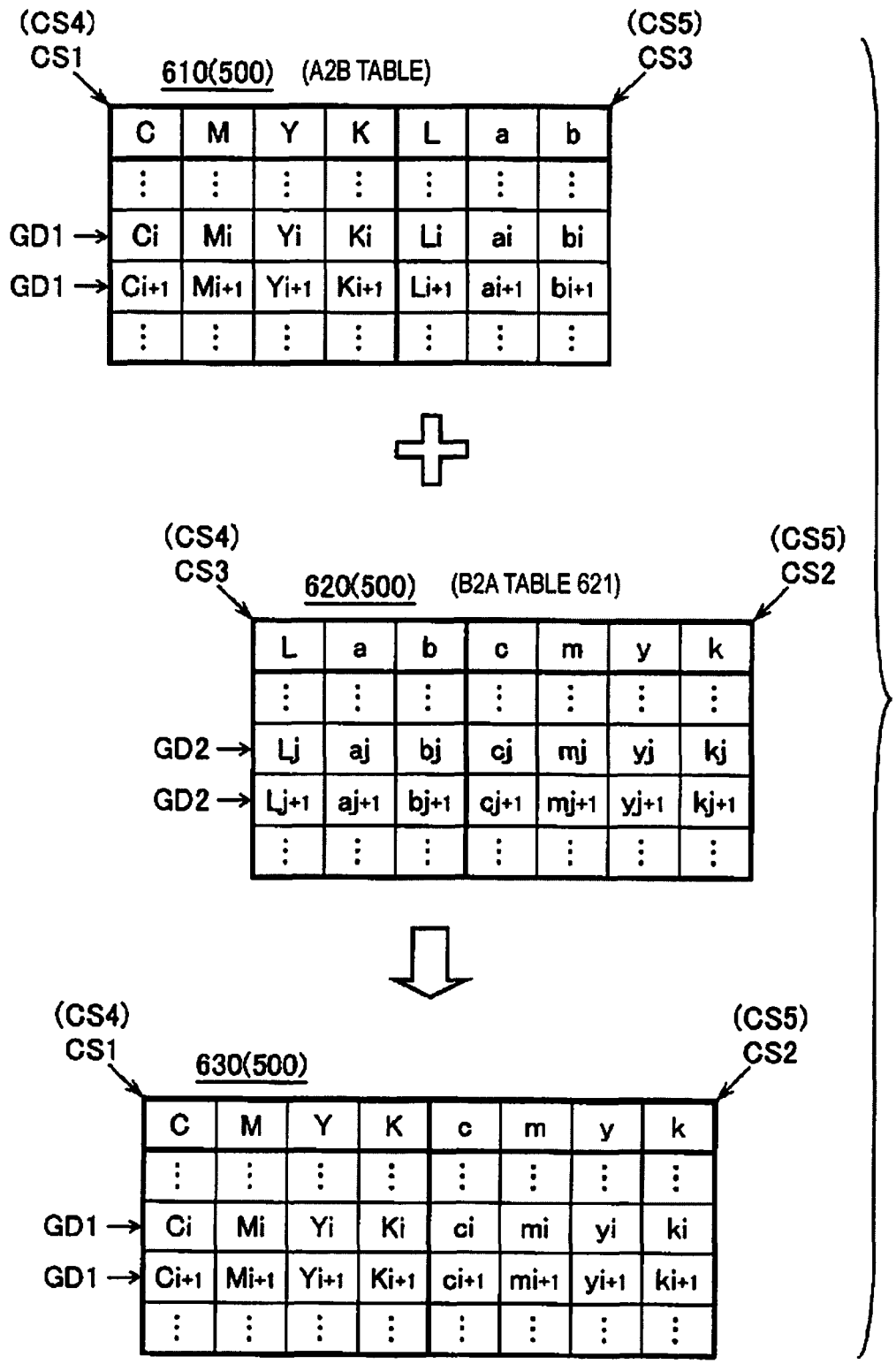
FIG. 3 is a diagram schematically illustrating an example of relationships between various profiles.

FIG. 3 schematically illustrates an example of relationships between the profiles 610, 620, and 630.

As illustrated in FIG. 3, the input profile 610 is data defining a correspondence relationship between CMYK values ($C_i$, $M_i$, $Y_i$, $K_i$) in a CMYK color space (an example of a first device-dependent color space CS1) matching the ink used by the target printing press 300, and Lab values ($L_i$, $a_i$, $b_i$) in a Lab color space (an example of a PCS (profile connection space) CS3). In this case, grid points GD1 in the A2B table are normally arranged at substantially equal intervals in a C axis direction, an M axis direction, a Y axis direction, and a K axis direction in the CMYK color space. Here, the variable i is a variable identifying the grid points GD1 set in the CMYK color space (CS1). The CMYK values are examples of first coordinate values. The Lab values are examples of device-independent coordinate values. In the input profile 610, the CMYK color space (CS1) is an example of an input color space CS4, and the Lab color space (CS3) is an example of an output color space CS5.

Note that the first device-dependent color space may also be referred to as a first color space.

The output profile 620 is data defining a correspondence relationship between Lab values ($L_j$, $a_j$, $b_j$) in the Lab color space (CS3) and cmyk values ($c_j$, $m_j$, $y_j$, $k_j$) in the cmyk color space (an example of the second device-dependent color space CS2) matching the ink used by the ink jet printer 200. In this case, grid points GD2 in the B2A table 621 are normally arranged at substantially equal intervals in an L axis direction, an a axis direction, and a b axis direction in the Lab color space. Here, the variable j is a variable identifying the grid points GD2 set in the Lab color space (CS3). The term "cmyk color space" is used to distinguish the color space matching the ink used by the printer 200 from the color space matching the ink used by the target printing press 300. The cmyk values are examples of the second coordinate values. In the output profile 620, the Lab color space (CS3) is an example of the input color space CS4, and the cmyk color space (CS2) is an example of the output color space CS5. The color reproduction range of the output colors expressed by the cmyk values ($cmyk_p$) is dependent on the printer 200. Accordingly, even in a case where the Lab values ($L_j$, $a_j$, $b_j$) of the B2A table 621 are values expressing out of the color reproduction range of the printer 200, the cmyk values ($c_j$, $m_j$, $y_j$, $k_j$) obtained through mapping to the color reproduction range of the printer 200 are associated with the Lab values ($L_j$, $a_j$, $b_j$).

Note that the second device-dependent color space may also be referred to as a second color space.

The device link profile 630 is data defining a correspondence relationship between the CMYK values ($C_i$, $M_i$, $Y_i$, $K_i$) in the CMYK color space (CS1) and the cmyk values ($c_i$, $m_i$, $y_i$, $k_i$) in the CMYK color space (CS2). Here, the variable i is a variable identifying the grid points GD1 set in the CMYK color space (CS1). The device link profile 630 is obtained by linking the input profile 610 and the output profile 620. In the device link profile 630, the CMYK color space (CS1) is an example of the input color space CS4, and the cmyk color space (CS2) is an example of the output color space CS5.

Note that the conversion tables included in the profiles 610, 620, and 630 are not limited to single conversion tables, and may be combinations of a plurality of conversion tables, such as a combination of a one-dimensional conversion table, a three-dimensional or four-dimensional conversion table, and a one-dimensional conversion table. Accordingly, the conversion tables illustrated in FIG. 3 may directly indicate three-dimensional or four-dimensional conversion tables included in the profiles 610, 620, and 630, or may indicate a state in which a plurality of conversion tables included in the profiles 610, 620, and 630 have been combined.

The "grid point" refers to a virtual point disposed in the input color space, and it is assumed that the output coordinate values corresponding to positions of the grid points in the input color space are held in the grid points. In addition to a plurality of grid points being disposed uniformly throughout the input color space, this technique also includes disposing a plurality of grid points non-uniformly throughout the input color space.

Figure 4:
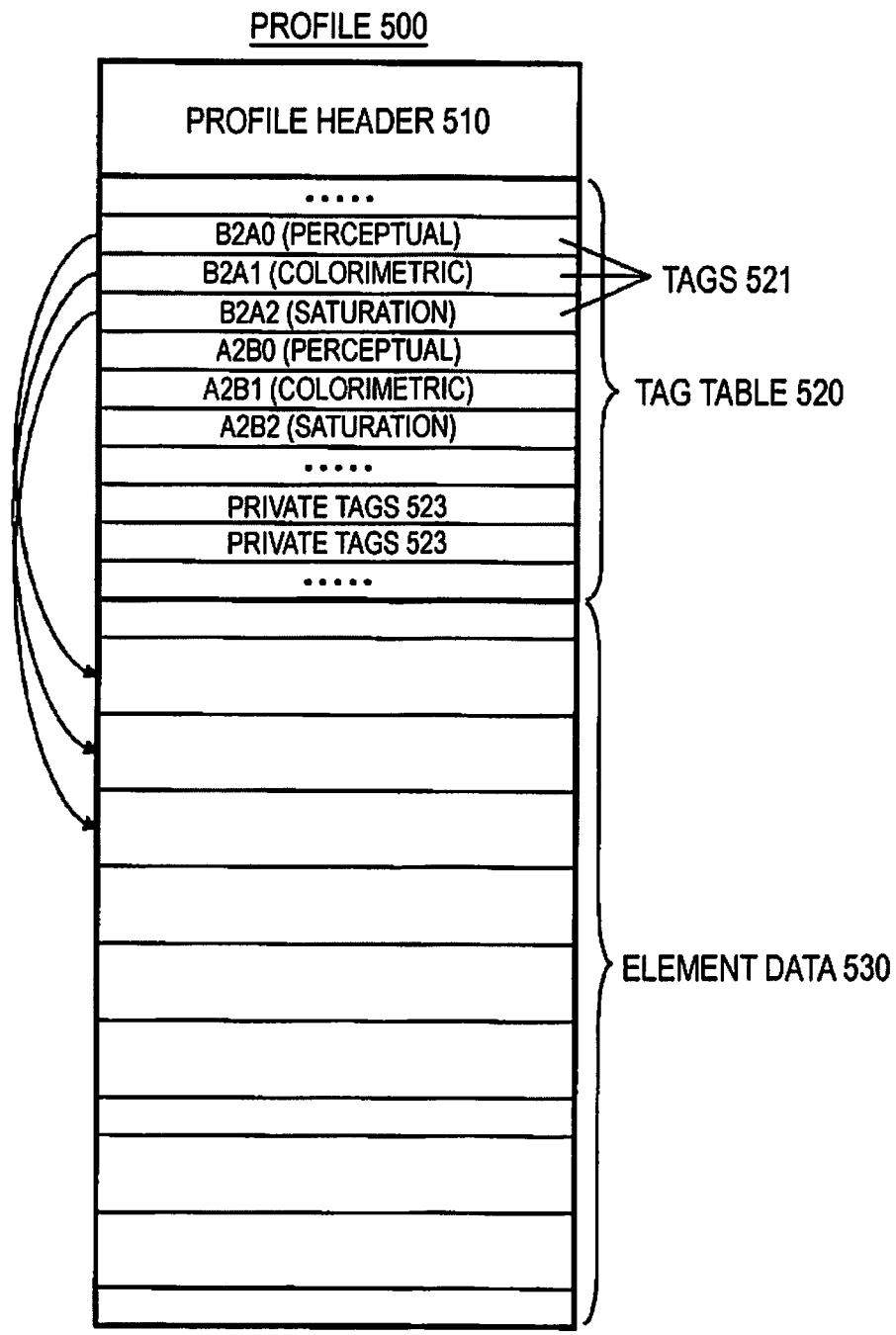
FIG. 4 is a diagram schematically illustrating an example of the structure of a profile.

FIG. 4 schematically illustrates an example of the structure of the profile 500. The profile 500 illustrated in FIG. 4 is an ICC profile, and includes a profile header 510 and a tag table 520. The profile 500 includes tags 521, which are information necessary for converting color information between PCS and a device-dependent color space. The tags 521 may include private tags 523 for customizing the profile 500.

A2Bx tags (where x is 0, 1, or 2 in FIG. 4) for devices (300, 200) include, as element data 530, color conversion tables for converting from the device-dependent color space (the CMYK color space, the cmyk color space) to the Lab color space. B2Ax tags for the devices (300, 200) include, as the element data 530, color conversion tables for converting from the Lab color space to the device-dependent color space (the CMYK color space, the cmyk color space).

The A2B0 tag and the B2A0 tag indicated in FIG. 4 are information for perceptual color conversion. Perceptual color conversion prioritizes tone reproduction, and thus is mainly used to convert photographic images with wide color gamut. The A2B1 tag and the B2A1 tag indicated in FIG. 4 are information for carrying out Media-Relative Colorimetric color conversion or Absolute Colorimetric color conversion. Colorimetric color conversion is faithful to colorimetric values, and thus is mainly used in conversion for color calibration output of a digital proof, for which accurate color matching is required. The A2B2 tag and the B2A2 tag indicated in FIG. 4 are information for color conversion prioritizing saturation. Color conversion prioritizing saturation prioritizes vividness of a color rather than color accuracy, and is mainly used in conversion of graph displays and the like for business graphics.

Figure 5:
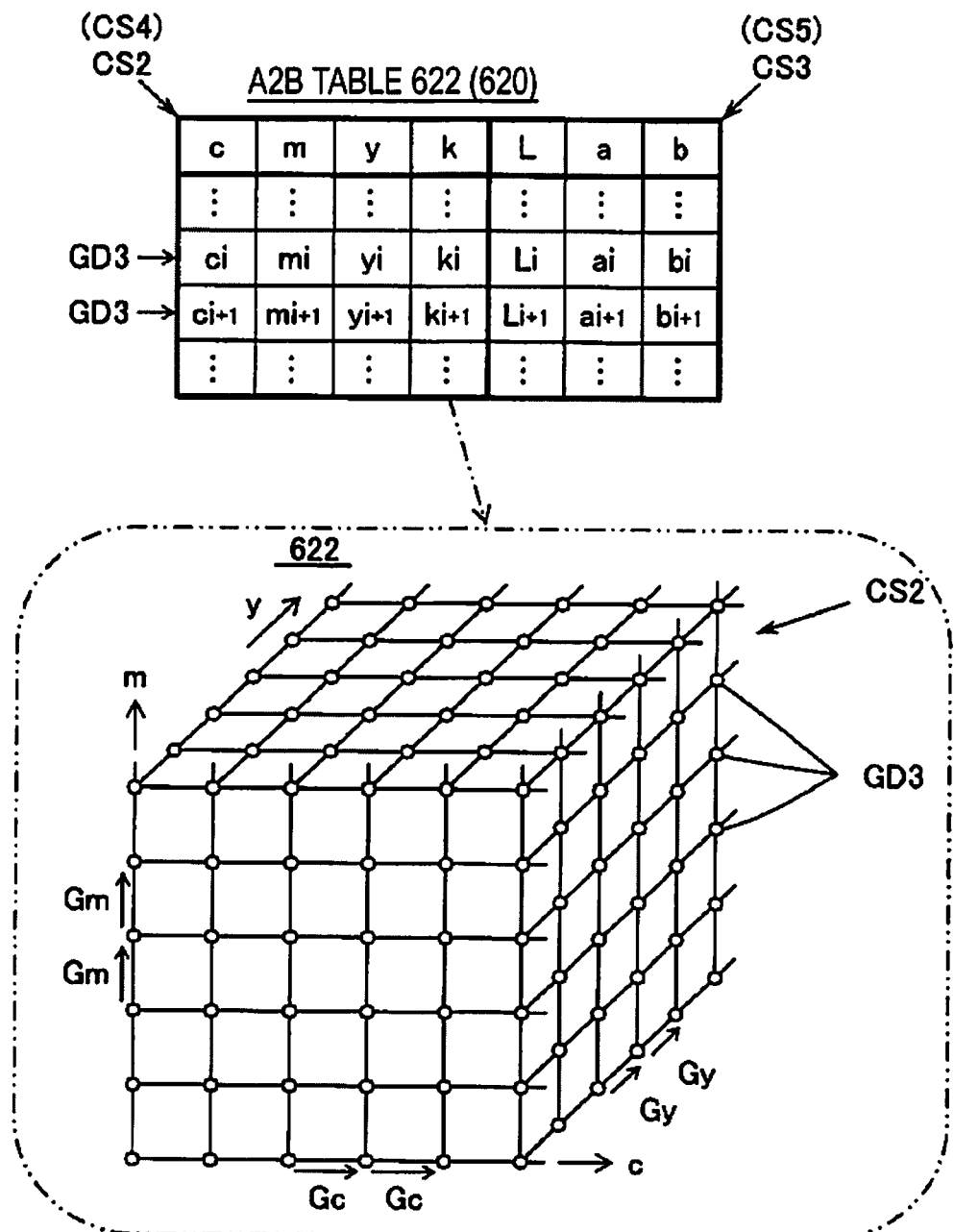
FIG. 5 is a diagram schematically illustrating an example of the structure of a second conversion table of an output profile.

FIG. 5 schematically illustrates an example of the structure of the A2B table 622 in the output profile 620. The lower part of FIG. 5 schematically illustrates an example of the positions of grid points GD3 in the cmyk color space (CS2). Here, the cmyk color space is a four-dimensional color space, and thus FIG. 5 illustrates a three-dimensional virtual space formed by a c axis, an m axis, and a y axis. The grid points GD3 in the A2B table 622 are normally arranged at substantially equal intervals in a c axis direction, an m axis direction, a y axis direction, and a k axis direction in the cmyk color space. Here, the variable i is a variable identifying the grid points GD3 set in the cmyk color space (CS2). In the lower part of FIG. 5, Gc indicates the interval between the grid points GD3 in the c axis direction, Gm indicates the interval between the grid points GD3 in the m axis direction, and Gy indicates the interval between the grid points GD3 in the y axis direction. The Lab values ($L_i$, $a_i$, $b_i$) of the A2B table 622 are coordinate values expressing the output colors in the color reproduction range of the printer 200 (the cmyk values $c_i$, $m_i$, $y_i$, $k_i$). Of course, the conversion table illustrated in FIG. 5 may directly indicate the four-dimensional conversion table included in the output profile 620, or may indicate a state in which a plurality of conversion tables included in the output profile 620 have been combined.

As illustrated in FIGS. 3 and 5, the output profile 620 includes the B2A table 621, which is used in color conversion from Lab values to cmyk values, and the A2B table 622, which is used in color conversion from cmyk values to Lab values. The B2A table 621 is a three-dimensional color conversion table that has undergone gamut mapping, and the A2B table 622 is four-dimensional color conversion tables in which the cmyk values expressing the colors that can be output are associated with PCS values. Accordingly, when the PCS values $Lab_{S1}$ are converted into cmyk values $cmyk_p$ through the B2A table 621, and the cmyk values $cmyk_p$ are then converted into the PCS values $Lab_{S2}$ through the A2B table 622, there are situations where the PCS values $Lab_{S2}$ do not match the original PCS values $Lab_{S1}$.

5. SPECIFIC EXAMPLE OF PROCESSING BY PROFILE ADJUSTMENT SYSTEM

FIG. 6 illustrates an example of a target setting process carried out by the host device 100 illustrated in FIG. 1. The optimization process illustrated in FIG. 8 is carried out after this target setting process. FIG. 7 illustrates an example of a user interface (UI) screen 800 displayed in step S102 of FIG. 6. The host device 100 executes a plurality of processes in parallel through multitasking. Here, step S111 in FIG. 6 corresponds to the adjustment target profile reception step ST1, the adjustment target profile reception function FU1, and the adjustment target profile reception unit U1. Step S112 in FIG. 6 corresponds to the target reception step ST2, the target reception function FU2, and the target reception unit U2. Steps S120 to S124 in FIG. 6 correspond to the conversion step ST3, the conversion function FU3, and the conversion unit U3. The word "step" will be omitted hereinafter.

Upon the target setting process illustrated in FIG. 6 starting, the host device 100 displays the UI screen 800 illustrated in FIG. 7 in the display device 130 (S102). The UI screen 800 includes an input profile selection field 811, an output profile selection field 812, a device link profile selection field 813, an adjustment target profile reception field 820, an adjustment target color space selection field 830, a target reception area 840, a "set from image" button 841, an add button 842, a remove button 843, an adjustment data selection field 845, a chart print button 846, a measure color button 847, an adjustment range designation field 850, an intent designation field 860, an execute adjustment button 870, a load history button 881, and a save history button 882.

The host device 100 receives operations to the aforementioned fields and buttons through the input device 115 (S110), and moves the process to S120 upon receiving an operation to the execute adjustment button 870. The process of S110 includes the following processes S111 to S114.

(S111) A process of receiving one or more profiles to be used in color conversion from among the profiles 610, 620, and 630, and of receiving the adjustment target profile 550. Note that a combination of the profiles 610 and 620 for the color conversion, or color conversion in which the device link profile 630 is designated, indicate conversion from CMYK values to cmyk values. Color conversion in which only the output profile 620 is designated indicates conversion from Lab values to cmyk values.

(S112) A process of receiving the input of the adjustment target T0 at the adjustment point P0, using the coordinates of the PCS CS3 as a reference.

(S113) A process of receiving the designation of an adjustment range A0 in the CMYK color space (CS1) (see FIG. 12) for adjusting based on the target T0 in the adjustment target profile 550.

(S114) A process of receiving one designated intent, from among a plurality of rendering intents for defining a correspondence relationship of the adjustment target profile 550.

First, the process of S111 will be described with reference to FIGS. 7 and 11A to 11E. Here, the elements in FIGS. 11A to 11E surrounded by bold lines indicate the adjustment target profile 550. In the device link profile 630 indicated in FIG. 11C, the target of adjustment is a device link table, "original A2B" indicates the original input profile, and "original B2A" indicates the original output profile.

The host device 100 receives an operation for selecting a profile from among the profiles 500 stored in the storage device 114 by receiving operations to the selection fields 811 to 813 through the input device 115.

In the input profile selection field 811, an input profile to be used in the color conversion can be selected from input profiles 610 stored in the storage device 114 when the input profile 610 is to be used for the color conversion. When the input profile 610 is not to be used in the color conversion, the input profile selection field 811 may be left blank.

In the output profile selection field 812, an input profile to be used in the color conversion can be selected from output profiles 620 stored in the storage device 114 when the output profile 620 is to be for the color conversion. When the output profile 620 is not to be used in the color conversion, the output profile selection field 812 may be left blank.

In the device link profile selection field 813, a device link profile to be used in the color conversion can be selected from device link profiles 630 stored in the storage device 114 when the device link profile 630 is to be used in the color conversion. When the device link profile 630 is not to be used in the color conversion, the device link profile selection field 813 may be left blank.

Figure 11A:
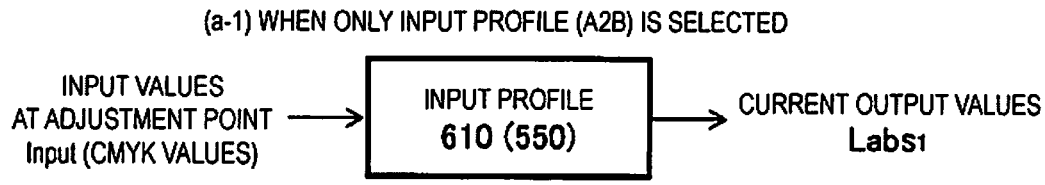
FIGS. 11A to 11E are diagrams schematically illustrating a calculation example of current output values.

As a reference example, when the input profile 610 has been selected in the input profile selection field 811 only (a-1), only the input profile 610 is used in the color conversion, as illustrated in FIG. 11A. The processes of S122 to S124, described later, are carried out only when the output profile 620 is to be used, and thus the situation illustrated in FIG. 11A will not be described in detail.

Figure 11B:
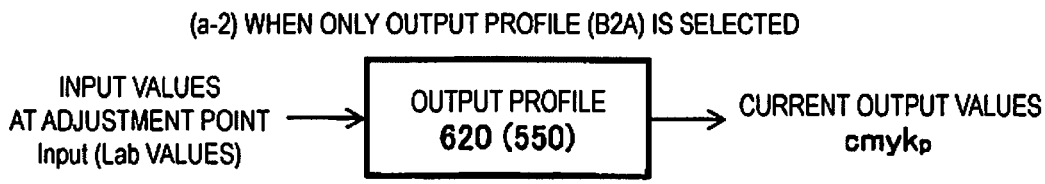

When the output profile 620 is selected in the output profile selection field 812 only (a-2), only the output profile 620 is used in the color conversion, as indicated in FIG. 11B, and the output profile 620 automatically becomes the adjustment target profile 550. In this case, the Lab values correspond to the first coordinate values, and the cmyk values correspond to the second coordinate values.

Figure 11C:
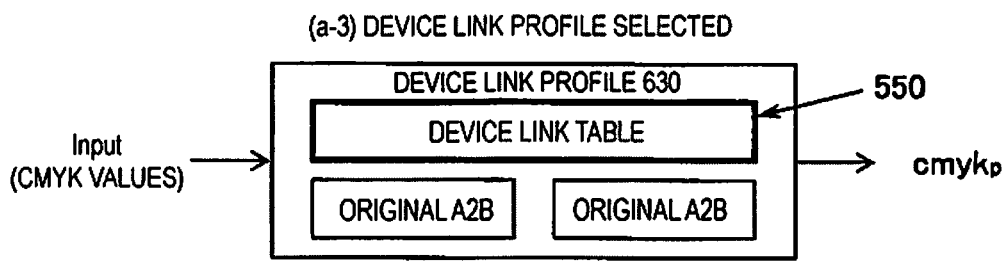

When the device link profile 630 is selected in the device link profile selection field 813 only (a-3), the device link profile 630 is used in the color conversion, as indicated in FIG. 11C, and the device link profile 630 (specifically, the internal device link table) automatically becomes the adjustment target profile 550. In this case, the CMYK values correspond to the first coordinate values, and the cmyk values correspond to the second coordinate values.

Figure 11D:
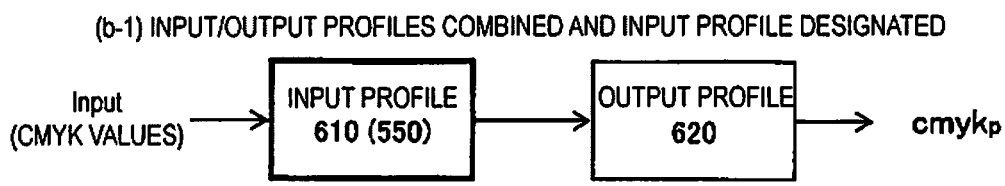
Figure 11E:
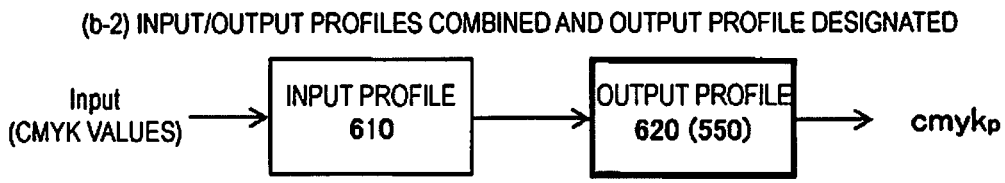

When the input profile 610 is selected in the input profile selection field 811 and the output profile 620 is furthermore selected in the output profile selection field 812, the input profile 610 and the output profile 620 are used in combination in the color conversion, as indicated in FIGS. 11D and 11E. In this case, the CMYK values correspond to the first coordinate values, and the cmyk values correspond to the second coordinate values.

The host device 100 carries out a process for changing the designated items in the adjustment target profile reception field 820 in accordance with the selections made in the selection fields 811 to 813 described above.

When the output profile 620 has been selected in the output profile selection field 812 only, only the output profile 620 can be designated in the adjustment target profile reception field 820 as a target for adjustment. When the device link profile 630 has been selected in the device link profile selection field 813 only, only the device link profile 630 can be designated in the adjustment target profile reception field 820 as a target for adjustment.

When the input profile 610 has been selected in the input profile selection field 811 and the output profile 620 has furthermore been selected in the output profile selection field 812, one designated item can be selected from the profiles 610, 620, and 630 in the adjustment target profile reception field 820. A situation where the input profile 610 has been selected in the adjustment target profile reception field 820 corresponds to "(b-1) input profile designated in combination with input/output profiles", indicated in FIG. 11D. A situation where the output profile 620 has been selected in the adjustment target profile reception field 820 corresponds to "(b-2) output profile designated in combination with input/output profiles", indicated in FIG. 11E. A situation where the device link profile 630 has been selected in the adjustment target profile reception field 820 corresponds to "(a-3) device link profile selected", indicated in FIG. 11C.

As a reference example, a single designated item can be selected in the adjustment target color space selection field 830 from among the CMYK color space (CS1), the cmyk color space (CS2), and the PCS CS3. When the adjustment target T0 is set based on the colorimetric values $Lab_p$ of a patch printed by the printer 200, a user may select the PCS CS3 in the adjustment target color space selection field 830.

Furthermore, the process of S112 will be described with reference to FIGS. 7 and 12.

The host device 100 carries out a process for changing input items in the target reception area 840 in accordance with the selections made in the aforementioned fields 811 to 813, and 830. The host device 100 carries out a process for changing the input items in the target reception area 840 in accordance with the selection made in the adjustment data selection field 845. One of "absolute value" and "relative value" can be selected in the adjustment data selection field 845. "Absolute value" is an option in which an adjustment target T0 is received as the coordinate values in a color space. "Relative value" is an option in which the adjustment target T0 is received as a difference from the current coordinate values in the color space. When "relative value" is selected in the adjustment data selection field 845, an input field for coordinate values (ΔL, Δa, Δb) of the adjustment target T0, as the relative values $\Delta Lab_{T\text{-}p}$ from the current coordinate values in the color space, is displayed in the target reception area 840, as indicated in FIG. 7. When "absolute value" is selected in the adjustment data selection field 845, an input field for coordinate values (T_L, T_a, T_b) of the adjustment target T0 is displayed in the target reception area 840 along with a display field for the current coordinate values (C_L, C_a, C_b) in the color space.

Figure 12:
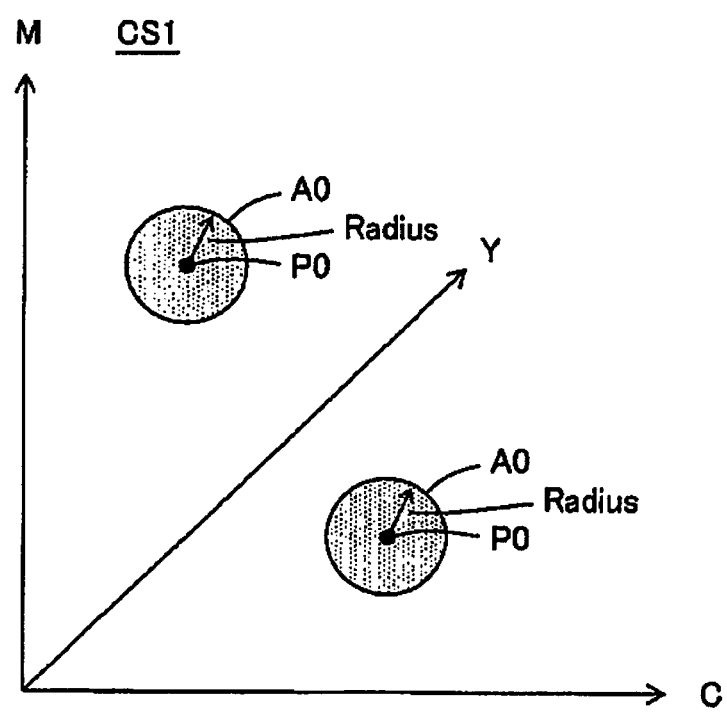
FIG. 12 is a diagram schematically illustrating an example of setting an adjustment point.

As illustrated in FIG. 12, an adjustment point P0 for setting the adjustment target T0 is set in the CMYK color space (CS1). Here, the CMYK color space is a four-dimensional color space, and thus FIG. 12 illustrates a three-dimensional virtual space formed by a C axis, an M axis, and a Y axis. For example, upon receiving an operation of the "set from image" button 841 in the UI screen 800 illustrated in FIG. 7, the host device 100 displays a screen schematically expressing the CMYK color space (CS1) in the display device 130, obtains CMYK values through operations by the input device 115, and updates the information of the target reception area 840. Upon a new adjustment point P0 being designated, the host device 100 applies a corresponding ID (identification information), associates the obtained CMYK values as well as Lab values and the like found from the CMYK values with the ID, and displays the CMYK values and the Lab values in the target reception area 840. Upon the add button 842 being operated, the host device 100 adds the ID, and expands an input field corresponding to the added ID in the target reception area 840. Upon the remove button 843 being operated, the host device 100 receives a designation of an ID to be deleted, and deletes the input field corresponding to the designated ID.

Additionally, upon receiving an operation of the chart print button 846, the host device 100 generates print data of a color chart CH1, which has color patches expressing the colors at the respective adjustment points P0, and sends the print data to the printer 200. Having received this print data, the printer 200 prints the color chart CH1, which has color patches expressing the colors at the respective adjustment points P0, onto the print substrate ME1.

Furthermore, upon receiving an operation of the measure color button 847, the host device 100 instructs the colorimetric device 120 to measure the color of the respective patches in the color chart CH1. Having received this instruction, the colorimetric device 120 measures the color of the respective patches in the color chart CH1, and sends the colorimetric values $Lab_p$ of the patches to the host device 100. Having received the colorimetric values $Lab_p$, the host device 100 may display the colorimetric values $Lab_p$ in the display device 130, or may cause the printer 200 to print the values. The user can view the output colorimetric values $Lab_p$ and input the adjustment target T0 in the target reception area 840. Additionally, the host device 100 may automatically input the colorimetric values $Lab_p$ of the patches into the target T0 input field. When the adjustment target T0 is the relative values ($\Delta L$, $\Delta a$, $\Delta b$), the host device 100 may calculate differences of the L, a, and b components in the target colorimetric values $Lab_T$ from the current colorimetric values $Lab_p$ and automatically input the differences into the target T0 input field.

Furthermore, upon receiving an operation of the load history button 881, the host device 100 reads out the adjustment history stored in the storage device 114 and adds the history to the target reception area 840. Upon receiving an operation of the save history button 882, the host device 100 stores the information in the target reception area 840 as the adjustment history in the storage device 114.

Furthermore, the process of S113 will be described with reference to FIGS. 7 and 12.

The host device 100 receives, in the adjustment range designation field 850, the input of a radius taking the adjustment point P0 as a base point. This radius is expressed as a relative value of 0 to 100% of a Euclidian distance in the first color space CS1. Accordingly, the adjustment range A0 of the adjustment target profile 550 is designated in the first color space CS1. FIG. 12 schematically illustrates an example of the adjustment range A0 when the radius has been designated. As illustrated in FIG. 12, the adjustment range A0 is set for each adjustment point P0. The host device 100 can receive the input of the adjustment range A0 for the respective adjustment points P0 in the target reception area 840.

Furthermore, the process of S114 will be described with reference to FIG. 7.

The host device 100 receives, in the intent designation field 860, the designation of a rendering intent for defining a correspondence relationship of the adjustment target profile 550. Although not illustrated in FIG. 7, a plurality of designated items in the intent designation field 860 include three types, that is, "perceptual", "relative colorimetric", and "saturation". Of course, "absolute colorimetric" may be included in the designated items, or one or more of the "perceptual", "relative colorimetric", and "saturation" designated items may be omitted. FIG. 7 illustrates an example in which "perceptual" is designated as the designated intent.

Upon receiving an operation of the execute adjustment button 870 indicated in FIG. 7, the host device 100 calculates the adjustment target PCS values $Lab_{S2}$, which are color values corresponding to the output colors obtained when the colors of the adjustment point P0 are output by the printer 200 (S120 to S124). FIG. 2 illustrates the process of calculating the adjustment target PCS values $Lab_{S2}$ from the CMYK values $CMYK_{in}$ of the adjustment point P0.

First, in S120, the host device 100 acquires the PCS values $Lab_{S1}$ of the adjustment point P0. As described above, when the coordinates ($CMYK_{in}$) of the adjustment point P0 are received, with the CMYK color space (CS1) as a reference, the CMYK values $CMYK_{in}$ is to be converted into the PCS values $Lab_{S1}$. The host device 100 converts the CMYK values $CMYK_{in}$ at the adjustment point P0 into the PCS values $Lab_{D1}$ in accordance with the A2B table of the input profile 610.

Here, color conversion according to a profile (for example, an ICC profile) will be expressed as $f_{icc}$ (first argument, second argument, third argument). The first argument expresses the profile to be used. In the first argument, InputProfile represents the input profile, OutputProfile represents the output profile, DLProfile represents the device link profile, and OrOutputProfile represents an output profile used to create the device link profile. The second argument expresses the color conversion tables used in the profile expressed by the first argument. In the second argument, A2B represents conversion from device colors to device-independent colors, B2A represents conversion from device-independent colors to device colors, and A2B0 represents conversion through a device link table. The third argument expresses the input values (CMYK, RGB, Lab, and the like) of the adjustment point P0.

The conversion from CMYK values $CMYK_{in}$ to PCS values $Lab_{S1}$ is expressed by the following equation.

$$Lab_{S1} = f_{icc}(\text{InputProfile}, A2B, CMYK_{in})$$

Note that when the coordinates of the adjustment point P0 are received with the Lab color space (CS3) used as a reference, the coordinates are the PCS values $Lab_{S1}$. Accordingly, in S120, the host device 100 may acquire the coordinates ($Lab_{S1}$) of the adjustment point P0.

Next, in S122, the host device 100 converts the above-described PCS values $Lab_{S1}$ into the adjustment target color values $cmyk_p$, which are cmyk values (the second coordinate values), in accordance with the B2A table 621 of the output profile 620. This conversion is expressed through the following equation.

$$cmyk_p = f_{icc}(\text{OutputProfile}, B2A, Lab_{S1})$$

The above-described adjustment target color values $cmyk_p$ express output colors of the printer 200 before the adjustment of the adjustment point P0.

Next, in S124, the host device 100 converts the above-described adjustment target color values $cmyk_p$ into the adjustment target PCS values $Lab_{S2}$, in accordance with the A2B table 622 of the output profile 620.

$$Lab_{S2} = f_{icc}(\text{OutputProfile}, A2B, cmyk_p) = f_{icc}(\text{OutputProfile}, A2B, f_{icc}(\text{OutputProfile}, B2A, Lab_{S1}))$$

The above-described adjustment target PCS values $Lab_{S2}$ are device-independent coordinate values expressing the output colors of the printer 200. Note that the calculation of the adjustment target PCS values $Lab_{S2}$ corresponds to converting the PCS values $Lab_{S1}$ into the adjustment target color values $cmyk_p$ in accordance with the B2A table 621 of the output profile 620, and then converting the adjustment target color values $cmyk_p$ into the adjustment target PCS values $Lab_{S2}$ in accordance with the A2B table 622 of the same output profile 620. As such, this calculation can be called a "round-trip computation" of the output profile 620.

After the process of S124, the host device 100 carries out the optimization process illustrated in FIG. 8. This optimization process corresponds to the optimization step ST4, the optimization function FU4, and the optimization unit U4. In this specific example, the Boyden-Fletcher-Goldfarb-Shanno (BFGS) method, which is a quasi-Newton method, is used in the solution searching process of S210. Of course, a quasi-Newton method aside from the BFGS method, such as the DFP method, can be used for the solution searching process of S210. Aside from a quasi-Newton method, a Newton method, a conjugate gradient method, and the like can be used for the solution searching process of S210.

Upon the optimization process illustrated in FIG. 8 being started, the host device 100 calculates the target PCS values $Lab_{ST}$ by adding the relative values $\Delta Lab_{T-p}$ of the adjustment target T0, which uses the PCS CS3 coordinates as a reference, to the adjustment target PCS values $Lab_{S2}$ (S202).

$$Lab_{ST} = Lab_{S2} + \Delta Lab_{T-p}$$

Next, in S204, the host device 100 sets initial values $\Delta cmyk_i$ of the adjustment color values $\Delta cmyk$ added to the adjustment target color values $cmyk_p$ for matching the adjustment target T0. As illustrated in FIG. 9, a plurality of the initial values $\Delta cmyk_i$ are prepared, and are set one at a time from the initial values $\Delta cmyk_i$. Here, the variable i is a variable for identifying the initial values. In the A2B table 622 used in the optimization process of S210, a plurality of four-dimensional inputs (cmyk values) can exist for a three-dimensional output (Lab values). Accordingly, many extreme values (minimum values or maximum values) can exist for a target function $y = f(\Delta cmyk)$ that takes the four-dimensional adjustment color values $\Delta cmyk$ as a variable. As such, the solution searching process of S210 is carried out from a plurality of mutually-different initial values $\Delta cmyk_i$, and based on optimal solution candidates $\Delta cmyk_{pb}$, an optimal solution $\Delta cmyk_b$ is obtained.

FIG. 9 schematically illustrates an example of changing the initial values $\Delta cmyk_i$ of the adjustment color values $\Delta cmyk$. Here, the cmyk color space is a four-dimensional color space, and thus FIG. 9 illustrates a three-dimensional virtual space formed by a c axis, an m axis, and a y axis. In FIG. 9, the hatched circle indicates the position of the adjustment target color values $cmyk_p$. Here, the respective components of the initial values $\Delta cmyk_i$ are expressed as ($\Delta c_i$, $\Delta m_i$, $\Delta y_i$, $\Delta k_i$). One of the initial values $\Delta cmyk_i$ is ($\Delta c_i$, $\Delta m_i$, $\Delta y_i$, $\Delta k_i$) = (0, 0, 0, 0). This will be expressed as $\Delta cmyk_i = 0$. In this specific example, with $\Delta cmyk_i = 0$ as a center, the c values are shifted by an interval value Sc (Sc>0), the m values by an interval value Sm (Sm>0), and the y values by an interval value Sy (Sy>0), to prepare 3×3×3, or 27, of the initial values $\Delta cmyk_i$. To accelerate the optimization process, the initial value $\Delta k$ of k is fixed at 0. Accordingly, the initial values $\Delta cmyk_i$ are as follows.

$$(\Delta ci, \Delta mi, \Delta yi, \Delta ki) = (+Sc, +Sm, +Sy, 0)$$
$$(\Delta ci, \Delta mi, \Delta yi, \Delta ki) = (+Sc, +Sm, 0, 0)$$
$$(\Delta ci, \Delta mi, \Delta yi, \Delta ki) = (+Sc, +Sm, -Sy, 0)$$
$$(\Delta ci, \Delta mi, \Delta yi, \Delta ki) = (+Sc, 0, +Sy, 0)$$
$$(\Delta ci, \Delta mi, \Delta yi, \Delta ki) = (+Sc, 0, 0, 0)$$
$$\dots$$
$$(\Delta ci, \Delta mi, \Delta yi, \Delta ki) = (0, 0, 0, 0)$$
$$\dots$$
$$(\Delta ci, \Delta mi, \Delta yi, \Delta ki) = (-Sc, -Sm, -Sy, 0)$$

Of course, the initial value $\Delta k$ of k can be shifted by an interval value Sk (Sk>0).

Note that the range that the c values, m values, y values, and k values, which are the second coordinate values, can take on in the cmyk color space (CS2) is not particularly limited, but can be set to be from 0 to 100 ($0 \leq c \leq 100$, $0 \leq m \leq 100$, $0 \leq y \leq 100$, and $0 \leq k \leq 100$). In the cmyk color space (CS2), the coordinates of the grid points GD3 in the A2B table 622 (see FIG. 5) are assumed to have the same scale as the coordinates of initial provisional color values $cmyk_{pp} = cmyk_p + \Delta cmyk_i$. The interval values Sc, Sm, and Sy of the initial values $\Delta cmyk_i$ can be set to be approximately from 0.5 to 2 times the intervals Gc, Gm, and Gy of the grid points GD3, for example. As equations, this is expressed as follows.

$$0.5 \times Gc \leq Sc \leq 2 \times Gc$$
$$0.5 \times Gm \leq Sm \leq 2 \times Gm$$
$$0.5 \times Gy \leq Sy \leq 2 \times Gy$$

When a plurality of initial values $\Delta k$ are set for k as well, the interval value for the initial values $\Delta k$ (represented by Sk) can also be set to be approximately from 0.5 to 2 times the interval of the grid points GD3 in the k axis direction (represented by Gk), for example.

$$0.5 \times Gk \leq Sk \leq 2 \times Gk$$

When the interval values Sc, Sm, Sy, and Sk are set to be approximately from 0.5 to 2 times the intervals Gc, Gm, Gy, and Gk of the grid points GD3, the optimal solution $\Delta cmyk_b$ can be determined efficiently.

After the initial values $\Delta cmyk_i$ have been set, the host device 100 carries out the solution searching process (S210). The processes of S212 to S224 are repeated in this solution searching process.

First, in S212, the host device 100 calculates the provisional color values $cmyk_p$, in which the adjustment color values $\Delta cmyk$ are added to the adjustment target color values $cmyk_p$. First, the adjustment color values $\Delta cmyk$ when carrying out the process of S212 are the initial values $\Delta cmyk_i$.

Next, in S214, the host device 100 converts the provisional color values $cmyk_{pp}$ to provisional PCS values $Lab_{S3}$ in accordance with the A2B table 622. As equations, this is expressed as follows.

$$Lab_{S3} = f_{icc}(OutputProfile, A2B, cmyk_{pp})$$

Next, in S216, the host device 100 calculates the square of a color difference $\Delta E_{00}$ between the provisional PCS values $Lab_{S3}$ and the target PCS values $Lab_{ST}$. Use of the color difference square $\Delta E_{00}^2$ eliminates the calculation of the square root included in the color difference $\Delta E_{00}$, which accelerates the solution searching process. The color difference square $\Delta E_{00}^2$ is included in the target function $y=f(\Delta cmyk)$. Accordingly, the target function $y=f(\Delta cmyk)$ includes an element for bringing the provisional PCS values $Lab_{S3}$ closer to the target PCS values $Lab_{ST}=Lab_{S2}+\Delta Lab_{T-P}$.

Although taking more time for the solution searching process, the color difference $\Delta E_{00}$ itself may be included in the target function $y=f(\Delta cmyk)$ instead of the color difference square $\Delta E_{00}^2$. Additionally, a color difference $\Delta E^*_{ab}$, a sum of the absolute value of an L-value difference, the absolute value of an a-value difference, the absolute value of a b-value difference, and the like may be used instead of the color difference $\Delta E_{00}$.

Next, in S218, when the adjustment color values $\Delta cmyk$ are expressed as the vectors in the cmyk color space (CS2), the host device 100 calculates the square of magnitudes V of the vectors, separate from the color difference $\Delta E_{00}$, to calculate the target function $y=f(\Delta cmyk)$. Assuming the components of the adjustment color values $\Delta cmyk$ are expressed by $(\Delta c, \Delta m, \Delta y, \Delta k)$, the magnitudes V of the vectors when the adjustment color values $\Delta cmyk$ are expressed as the vectors in the cmyk color space (CS2) are as expressed in the following equation.

$$V = (\Delta c^2 + \Delta m^2 + \Delta y^2 + \Delta k^2)^{1/2}$$

By including the magnitudes V of the vectors of the adjustment color values $\Delta cmyk$ in the target function $y=f(\Delta cmyk)$, a situation where the absolute value of one of $\Delta c$, $\Delta m$, $\Delta y$, and $\Delta k$ in the adjustment color values $\Delta cmyk$ becomes prominently greater is suppressed.

The color difference square $\Delta E_{00}^2$ is included in the target function $y=f(\Delta cmyk)$, and thus the magnitudes V of the vectors of the adjustment color values $\Delta cmyk$ can also be included in the target function $y=f(\Delta cmyk)$.

$$V^2 = \Delta c^2 + \Delta m^2 + \Delta y^2 + \Delta k^2$$

This eliminates the calculation of the square root included in the magnitudes V of the vectors, which accelerates the solution searching process.

Although taking more time for the solution searching process, the magnitudes v of the vectors of the adjustment color values $\Delta cmyk$ themselves may be included in the target function $y=f(\Delta cmyk)$ instead of the squares $V^2$ of the magnitudes of the vectors of the adjustment color values $\Delta cmyk$. Additionally, a sum of the absolute values of $\Delta c$, $\Delta m$, $\Delta y$, and $\Delta k$ and the like may be used instead of the magnitudes V of the vectors of the adjustment color values $\Delta cmyk$.

Next, in S220, the host device 100 calculates a cost C based on restriction conditions of the range from 0 to 100 which the CMYK values (an example of the second coordinate values) can take on. This is because the provisional color values $cmyk_{pp}=cmyk_p+\Delta cmyk$ preferably fall within the range from 0 to 100 that the cmyk values can take on. Here, the components of the provisional color values $cmyk_{pp}$ will be expressed as $(c_{pp}, m_{pp}, y_{pp}, \text{and } k_{pp})$. The cost C can be calculated according to the following equations, for example.

When $c_{pp}<0$, then $C=-c_{pp}\times Cco$

When $c_{pp}>100$, then $C=(c_{pp}-100)\times Cco$

When $m_{pp}<0$, then $C=-m_{pp}\times Cco$

When $m_{pp}>100$, then $C=(m_{pp}-100)\times Cco$

When $y_{pp}<0$, then $C=-y_{pp}\times Cco$

When $y_{pp}>100$, then $C=(y_{pp}-100)\times Cco$

When $k_{pp}<0$, then $C=-k_{pp}\times Cco$

When $k_{pp}>100$, then $C=(k_{pp}-100)\times Cco$

Aside from the above, $C=0$.

Note that the coefficient Cco is a positive number, and is desirably approximately $10^3 \leq Cco \leq 10^9$, which is a number sufficiently greater than the range from 0 to 100 that the CMYK values can take on.

When the above-described cost C is included in the target function $y=f(\Delta cmyk)$, the optimization process is carried out having applied the range from 0 to 100 that the CMYK values can take on to the restriction conditions for the range of the provisional color values $cmyk_{pp}$.

Of course, the cost C can be calculated in the same manner even in a case where the range that the second coordinate values can take on is out of the range from 0 to 100. For example, the second coordinate values are assumed as RGB values and a range that the second coordinate values can take on is assumed as from 0 to 255, and the components of provisional color values $RGB_{pp}$ are assumed as $(R_{pp}, G_{pp}, \text{and } B_{pp})$. The cost C of a target function $y=f(\Delta RGB)$ can be calculated according to the following equations, for example.

When $R_{pp}<0$, then $C=-R_{pp}\times Cco$

When $R_{pp}>255$, then $C=(R_{pp}-255)\times Cco$

When $G_{pp}<0$, then $C=-G_{pp}\times Cco$

When $G_{pp}>255$, then $C=(G_{pp}-255)\times Cco$

When $B_{pp}<0$, then $C=-B_{pp}\times Cco$

When $B_{pp}>255$, then $C=(B_{pp}-100)\times Cco$

Aside from the above, $C=0$.

Here too, the coefficient Cco is a positive number, and is approximately $10^3 \leq Cco \leq 10^9$, which is a number sufficiently greater than the range from 0 to 255 that the RGB values can take on.

Additionally, the cost C may include an element aside from the range that the second coordinate values can take on. For example, when an error arises upon the processing of S212 to S220 being carried out for given adjustment color values $\Delta cmyk$, a value of approximately from $10^3$ to $10^9$ may be added to the cost C.

Next, in S222, the host device 100 calculates the target function y=f(Δcmyk) including the color difference square $\Delta E_{00}^2$, the square $V^2$ of the magnitudes of the vectors of the adjustment color values Δcmyk, and the cost C. The target function y=f(Δcmyk) is expressed by the following equation, for example.

$$y=\Delta E_{00}^2+w\times V^2+C$$

Note that the coefficient w is a positive number, and is approximately 1≤w≤10, from a standpoint of suppressing a situation where any one of the absolute values of Δc, Δm, Δy, and Δk of the adjustment color values Δcmyk becomes prominently greater.

The above-described processing of S212 to S222 is repeated until a solution causing the target function y=f (Δcmyk) to be a minimum value (an optimal solution candidate $\Delta cmyk_{pb}$) is found. When the process of S224 is carried out first, it cannot be determined whether the target function y=f(Δcmyk) is the minimum value, and thus the host device 100 returns the process to S212 after changing the adjustment color values Δcmyk by a minute amount. The host device 100 then repeats the processing of S212 to S224 while changing the adjustment color values Δcmyk by minute amounts. Upon finding a solution causing the target function y=f(Δcmyk) to be the minimum value, the host device 100 takes the solution as the optimal solution candidate $\Delta cmyk_{pb}$ and ends the solution searching process of S210.

The host device 100 repeats the processing of S204 to S210 until all of the initial values $\Delta cmyk_i$ of the adjustment color values Δcmyk are set (S230). Through this, an optimal solution candidate $\Delta cmyk_{pb}$ is found for the respective initial values $\Delta cmyk_i$.

Next, in S232, the host device 100 obtains the optimal solution $\Delta cmyk_b$ based on the plurality of optimal solution candidates $\Delta cmyk_{pb}$. In S210, target function $y=E_{00}^2+w\times V^2+C$ is calculated for the respective initial values $\Delta cmyk_i$ in the solution searching process. For example, in S232, the host device 100 may determine an optimal solution candidate $\Delta cmyk_{pb}$ in a case that the value of the target function y for the respective initial values $\Delta cmyk_i$ is lowest, as the optimal solution $\Delta cmyk_b$.

The obtained solution $\Delta cmyk_b$ is an optimal solution that brings the provisional PCS values $Lab_{S3}$ as close as possible to the target PCS values $Lab_{ST}=Lab_{S2}+\Delta Lab_{T-P}$. When obtaining the optimal solution $\Delta cmyk_b$, a situation where the absolute value of any of Δc, Δm, Δy, and Δk of the adjustment color values Δcmyk become prominently greater is suppressed, and the provisional color values $cmyk_{pp}$=adjustment target color values $cmyk_p$+adjustment color values Δcmyk are restricted to the range that the CMYK value can take on. The color reproduction accuracy of the adjustment target profile can be improved by adjusting the adjustment target profile 550 using the optimal solution $\Delta cmyk_b$.

Figure 10:
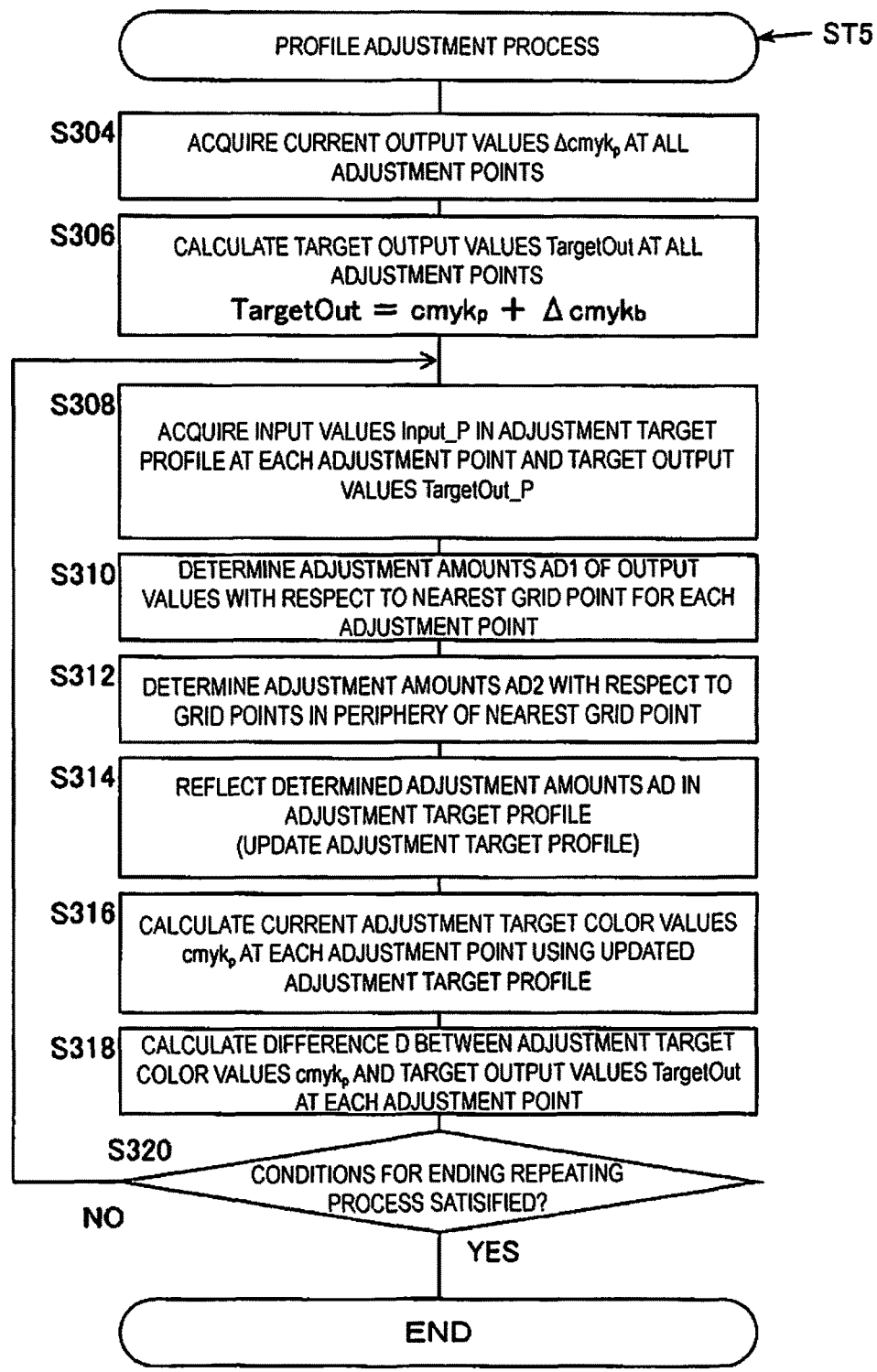
FIG. 10 is a flowchart illustrating an example of a profile adjustment process.

After the process of S232, the host device 100 carries out the profile adjustment process illustrated in FIG. 10. The profile adjustment process corresponds to the profile adjustment step ST5, the profile adjustment function FU5, and the profile adjustment unit U5. Here, when "perceptual" is designated in the intent designation field 860, the host device 100 uses information according to the A2B0 tag and the B2A0 tag in the profile 500, indicated in FIG. 4, in the processing from S304 on. When "relative colorimetric" is designated in the intent designation field 860, the host device 100 uses information according to the A2B1 tag and the B2A1 tag in the profile 500, indicated in FIG. 4, in the processing from S304 on. When "saturation" is designated in the intent designation field 860, the host device 100 uses information according to the A2B2 tag and the B2A2 tag in the profile 500, indicated in FIG. 4, in the processing from S304 on.

First, the host device 100 acquires the adjustment target color values $cmyk_p$, which are the current output values, for the respective adjustment points P0 input in the target reception area 840 (S304). This is in order to carry out adjustment using, as a reference, the output colors ($cmyk_p$) corresponding to the colors of the output image IMO formed on the print substrate ME1.

For example, when only the output profile 620 is designated for color conversion as indicated in FIG. 11B (a-2), input values Input at the respective adjustment points P0 are the PCS values $Lab_{S1}$ (with the respective components being Lp, ap, and bp), and the current output values are the adjustment target color values $cmyk_p$ (with the respective components being cp, mp, yp, and kp). Here, the variable p is a variable for identifying the adjustment points P0. The adjustment target profile 550 automatically becomes the output profile 620. The adjustment target color values $cmyk_p$ are expressed through the following equation (see FIG. 13).

$$cmyk_P=f_{icc}(\text{OutputProfile},B2A,\text{Input})$$

When only the device link profile 630 is designated for color conversion as indicated in FIG. 11C (a-2), input values Input at the respective adjustment points P0 are the CMYK values (Cp, Mp, Yp, Kp), and the adjustment target color values $cmyk_p$, which are the current output values, are the cmyk values (cp, mp, yp, kp). The adjustment target profile 550 automatically becomes the device link profile 630. The adjustment target color values $cmyk_p$ are expressed through the following equation (see FIG. 13).

$$cmyk_P=f_{icc}(\text{DLProfile},A2B0,\text{Input})$$

When the combination of the profiles 610 and 620 is designated for color conversion as indicated in FIGS. 11D and 11E (b-1), input values Input at the respective adjustment points P0 are the CMYK values (Cp, Mp, Yp, Kp), and the adjustment target color values $cmyk_p$, which are the current output values, are the cmyk values (cp, mp, yp, kp). In this case, the adjustment target color values $cmyk_p$ are expressed through the following equation (see FIG. 13), regardless of whether the adjustment target profile 550 is the input profile 610 or the output profile 620.

$$cmyk_p=f_{icc}(\text{OutputProfile},B2A,f_{icc}(\text{InputProfile},A2B,\text{Input}))$$

After the adjustment target color values $cmyk_p$ have been obtained, the host device 100 finds target output values TargetOut for the adjustment points P0 input in the target reception area 840 (S306). Here, the adjustment target color values $cmyk_p$ and the optimal solution $\Delta cmyk_b$ obtained through the optimization process illustrated in FIG. 8 are used.

$$\text{TargetOut}=cmyk_p+\Delta cmyk_b$$

After calculating the target output values TargetOut, the host device 100 acquires input values Input_P in the adjustment target profile 550 and adjustment target values TargetOut_P for the adjustment points P0 (S308). This is in order to adjust the correspondence relationship between the input values and the output values in the adjustment target profile 550. When information based on the designated intent is in the profile, color conversion is carried out according to the information based on the designated intent.

With (a-2) and (a-3) indicated in FIGS. 11B and 11C, that is, when a single profile (the output profile 620 or the device link profile 630) has been designated for color conversion, the designated profile is the adjustment target profile 550. Accordingly, the input values Input of the designated profile are used as the input values Input_P in the adjustment target profile 550, and the target output values TargetOut of the designated profile are used as the adjustment target values TargetOut_P in the adjustment target profile 550. As an equation, this is expressed as follows (see FIG. 15).

Input_P=Input

TargetOut_P=TargetOut

Current output values CurrentOut_P in the adjustment target profile 550 are adjustment target color values $cmyk_p$, which are the current output values in the designated profile.

CurrentOut_P=$cmyk_p$

When the relative values of the adjustment target T0 are expressed by the output color space CS5 of the adjustment target profile 550, it becomes TargetOut_P−CurrentOut_P.

Figure 14A:
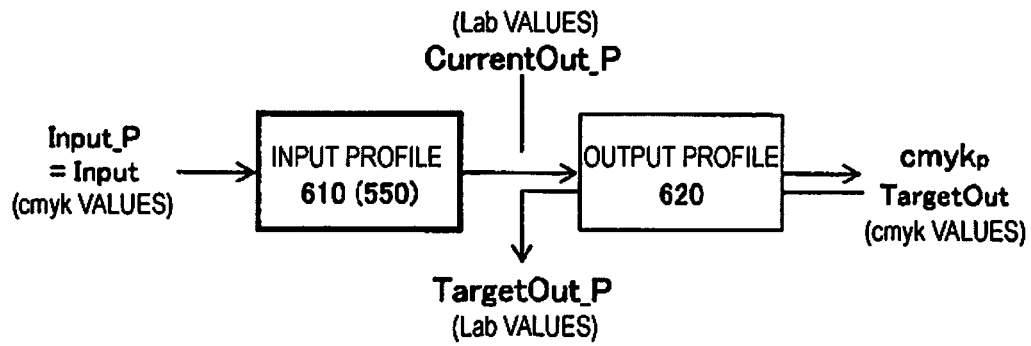
FIGS. 14A and 14B are diagrams schematically illustrating examples of finding input values and adjustment target values of an adjustment target profile.

As illustrated in FIG. 14A, with (b-1) indicated in FIG. 11D, that is, when a combination of the profiles 610 and 620 are selected for color conversion and the input profile 610 is designated as the adjustment target profile 550, the input values Input of the combination of the profiles 610 and 620 are used as the input values Input_P in the adjustment target profile 550. The adjustment target values TargetOut_P (Lab values) of the adjustment target profile 550 can be calculated from the target output values TargetOut, which are cmyk values (see FIG. 15).

Input_P=Input

TargetOut_P=$f_{icc}$(OutputProfile,A2B,TargetOut)

Finding the adjustment target values TargetOut_P (Lab values) of the adjustment target profile 550 from the target output values TargetOut (cmyk values) is in order to carry out adjustment taking the output colors $cmyk_p$, corresponding to the colors of the output image IMO, as a reference.

The current output values CurrentOut_P (Lab values) in the adjustment target profile 550 are expressed by the following equation.

CurrentOut_P=$f_{icc}$(InputProfile,A2B,Input)

When the relative values of the adjustment target T0 are expressed by the output color space CS5 of the adjustment target profile 550, it becomes TargetOut_P−CurrentOut_P.

Figure 14B:
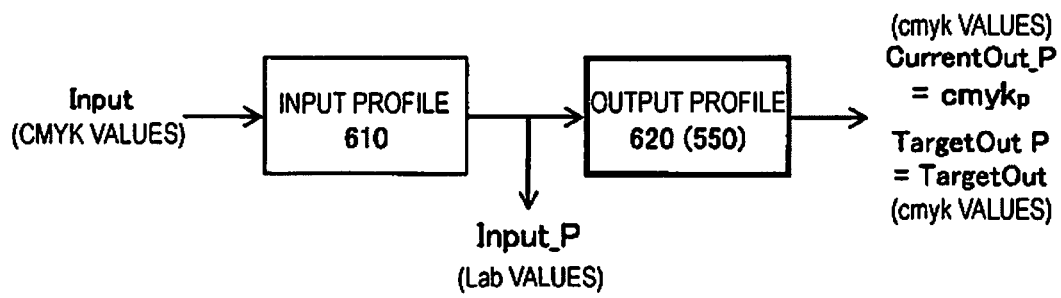

As illustrated in FIG. 14B, with (b-2) indicated in FIG. 11E, that is, when a combination of the profiles 610 and 620 are selected for color conversion and the output profile 620 is designated as the adjustment target profile 550, the target output values TargetOut of the combination of the profiles 610 and 620 are used as the adjustment target values TargetOut_P in the adjustment target profile 550. The input values Input_P (Lab values) of the adjustment target profile 550 can be calculated from the input values Input (CMYK values), which are CMYK values (see FIG. 15).

Input_P=$f_{icc}$(InputProfile,A2B,Input)

TargetOut_P=TargetOut

Additionally, the current output values CurrentOut_P (cmyk values) in the adjustment target profile 550 are adjustment target color values $cmyk_p$, which are the current output values in the combination of the profiles 610 and 620.

CurrentOut_P=$cmyk_p$

When the relative values of the adjustment target T0 are expressed by the output color space CS5 of the adjustment target profile 550, it becomes TargetOut_P−CurrentOut_P.

After acquiring the input values Input_P in the adjustment target profile 550 and the adjustment target values TargetOut_P, in S310 to S312, the host device 100 adjusts the adjustment range A0 of the adjustment target profile 550 based on the adjustment target T0.

First, referring to FIGS. 16A and 16B, the concept of adjusting the adjustment target profile 550 in the adjustment range A0 will be described. Here, in FIGS. 16A and 16B, the horizontal axis represents input values along a given coordinate axis of the input color space CS4, and the vertical axis represents output values along a given coordinate axis of the output color space CS5. For example, when the input color space CS4 is a CMYK color space, the horizontal axis is the C axis, the M axis, the Y axis, or the K axis. When the output color space CS5 is a Lab color space, the vertical axis is the L axis, the a axis, or the b axis. The white circles on the horizontal axis represent grid points GD0.

Figure 16A:
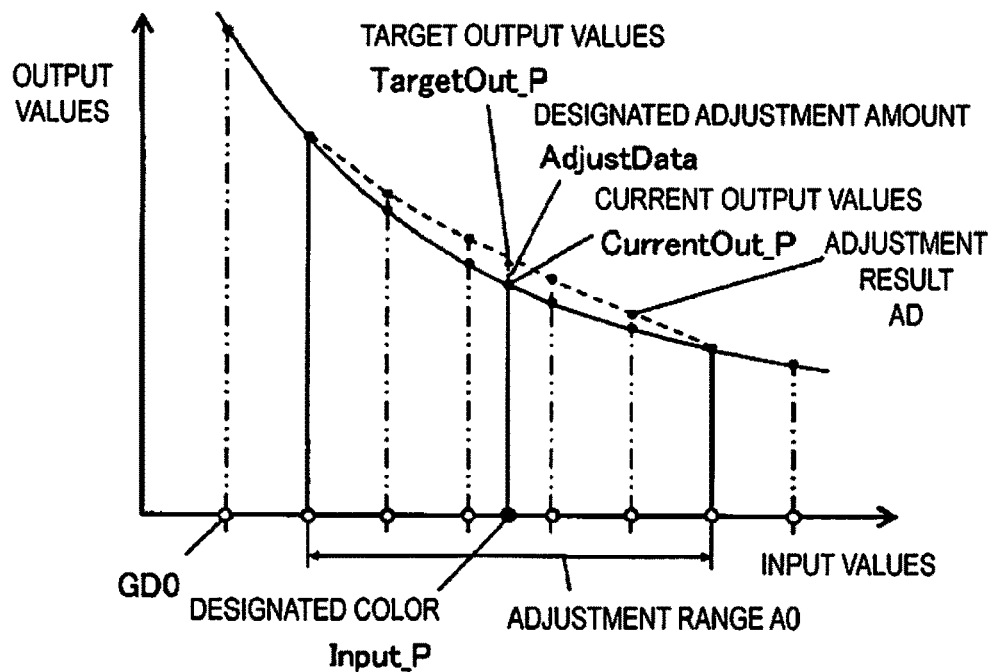
FIG. 16A is a diagram schematically illustrating adjustment amounts at each of grid points in a case of performing the adjustment in an output color space of an adjustment target profile.

FIG. 16A schematically illustrates adjustment amounts AD for the grid points GD0 when adjusting the output values. The adjustment points P0 designated by the user correspond to the input values Input_P. When the user instructs adjustment amounts AdjustData as the adjustment target T0, the adjustment target values TargetOut_P obtained by adding the adjustment amounts AdjustData to the current output values CurrentOut_P corresponding to the input values Input_P are set. Of course, in a case where an adjustment target color space CS6 is the Lab color space, the current output values CurrentOut_P and the adjustment target values TargetOut_P are expressed as Lab values, and the adjustment amounts AdjustData is expressed as the relative values (ΔLp, Δap, Δbp) of the Lab values.

The adjustment range A0 is set in the adjustment amounts AdjustData through inputs made in the adjustment range designation field 850, the target reception area 840, and the like illustrated in FIG. 7. Basically, the adjustment amounts of the output values with respect to the input values Input_P are maximized so that the adjustment amount is set to 0 at the boundaries of the adjustment range A0. However, because the actual adjustment is performed on the grid points GD0 in the adjustment target profile 550, the adjustment may affect a wider range than the set adjustment range A0.

Figure 16B:
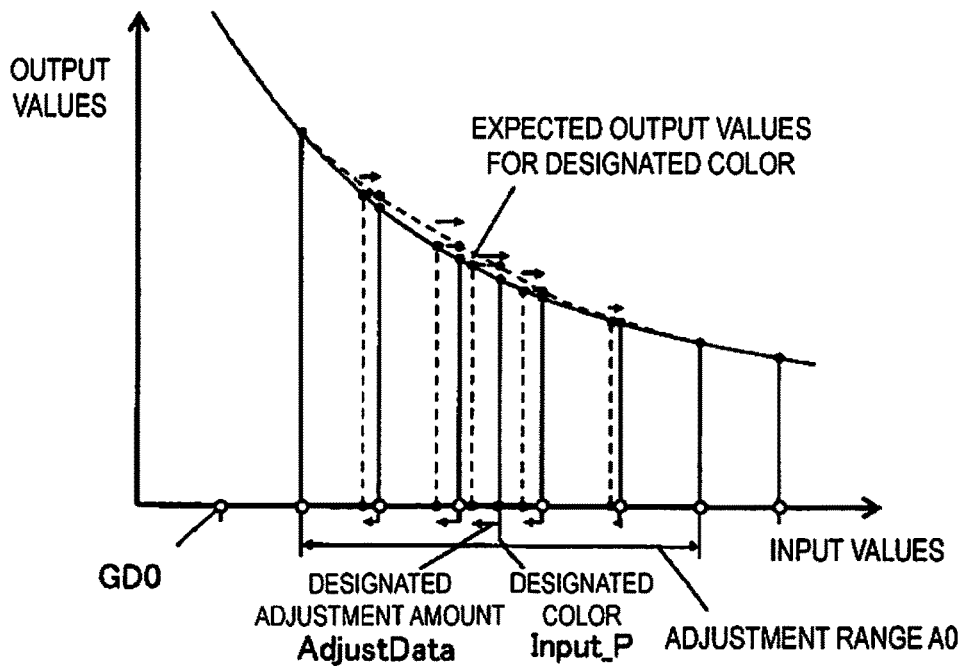
FIG. 16B is a diagram schematically illustrating adjustment amounts at each of grid points in a case of performing the adjustment in an input color space of the adjustment target profile.

FIG. 16B schematically illustrates adjustment amounts AD for the grid points GD0 when adjusting the input values. The adjustment points P0 designated by the user correspond to the input values Input_P. When the user instructs the adjustment amounts AdjustData as the adjustment target T0, the output values corresponding to the input values Input_P+AdjustData obtained by adding the adjustment amounts AdjustData to the input values Input_P become the expected output values at the user-designated adjustment point P0. Of course, in a case where the adjustment target color space CS6 is the Lab color space, the input values Input_P are represented by Lab values and the adjustment amounts AdjustData are represented by relative values (ΔLp, Δap, Δbp) of the Lab values.

The correction described above is performed for all coordinate axes in the input color space CS4 and all the coordinate values in the output color space CS5.

Next, an example of setting the adjustment amounts AD at the grid points GD0 of the adjustment range A0 will be described with reference to FIGS. 17A and 17B. Here, in FIGS. 17A and 17B, the horizontal axis represents the input values and the vertical axis represents the adjustment amounts AD of the output values. In addition, triangles on the horizontal axis represent grid points (excluding nearest grid points GDnearest) in the adjustment range A0, and squares on the horizontal axis represent grid points at which output values out of the adjustment range A0 are not modified.

Figure 17A:
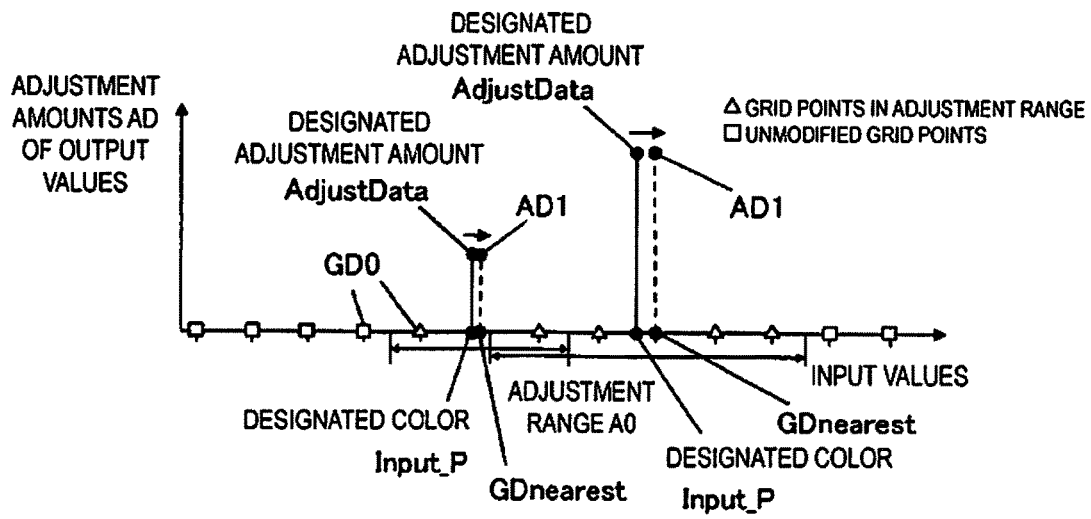
FIG. 17A is a diagram schematically illustrating an example of determining adjustment amounts of output values with respect to nearest grid points.

First, as illustrated in FIG. 17A, for the respective adjustment points P0, the host device 100 determines adjustment amounts AD1 of the output values with respect to the nearest grid point GDnearest that is the closest grid point to the adjustment point P0 (S310 in FIG. 10). FIG. 17A illustrates an example of determining the adjustment amounts AD1 of the output values when two adjustment points P0 (input values Input_P) are designated on a given coordinate axis of the input color space CS4. In the example of FIG. 17A, the adjustment amounts AdjustData for the input values Input_P are used as-is as the adjustment amounts AD1 of the output values with respect to the nearest grid point GDnearest. Of course, this technique is not limited to setting the adjustment amounts AD1 of the output values with respect to the nearest grid point GDnearest to the adjustment amounts AdjustData.

It should be noted that the nearest grid point GDnearest of a plurality of adjustment points near each other may be the same. In this case, for example, the adjustment amounts AdjustData of the adjustment points may be averaged at a ratio inversely proportional to the distance from the nearest grid point GDnearest to the respective adjustment points in the input color space CS4.

Figure 17B:
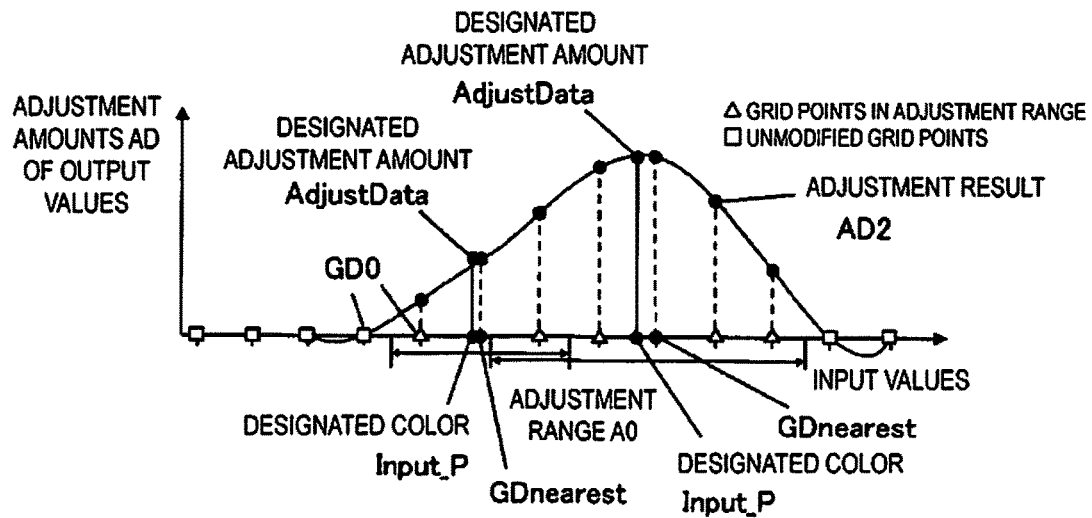
FIG. 17B is a diagram schematically illustrating an example of determining adjustment amounts of output values with respect to grid points in the periphery of nearest grid points.

After determining the adjustment amounts AD1 of the output values with respect to the nearest grid point GDnearest, the host device 100 determines adjustment amounts AD2 of the output values with respect to grid points (the grid points indicated by the triangles) in the periphery of the nearest grid point GDnearest in the adjustment range A0, as illustrated in FIG. 17B (S312 in FIG. 10). For example, the adjustment amounts AD2 of the output values with respect to the grid points in the periphery can be determined by setting the adjustment amounts to 0 for the output values with respect to the grid points out of the adjustment range A0, setting the adjustment amounts AD1 of the output values with respect to the above-described nearest grid point GDnearest to AdjustData, and carrying out an interpolation operation using a three-dimensional or four-dimensional tertiary spline function. Here, when the input color space CS4 is the CMYK color space, the interpolation operation may be carried out through a four-dimensional tertiary spline function, whereas when the input color space CS4 is the Lab color space, the interpolation operation may be carried out through a three-dimensional tertiary spline function. By carrying out such an interpolation operation, the adjustment amounts AD2 of the output values with respect to the grid points in the periphery are smoothly connected between the adjustment amounts AD1 of the output values with respect to the nearest grid points GDnearest and the adjustment amount "0" of the output values with respect to the grid points out of the adjustment range A0.

Of course, this technique is not limited to using a spline function for the interpolation operation.

Because the targets of the adjustment amounts AD are the grid points, when a plurality of adjustment points are nearby, there are situations where the same grid points are referred to when color-converting the input colors of the adjustment points in accordance with the adjustment target profile 550. With such grid points, the adjustment amounts AdjustData of the respective adjustment points are averaged and then adjusted.

After the adjustment amounts AD of the output values with respect to the grid points in the adjustment range A0 have been determined, the host device 100 reflects the determined adjustment amounts AD in the adjustment target profile 550 (S314 of FIG. 10). In other words, for the respective grid points in the adjustment range A0, a value obtained by adding the adjustment amount AD to the current output value may be written into the adjustment target profile 550 as the updated output value. For example, when the output color space CS5 of the adjustment target profile 550 is the cmyk color space, the adjustment amounts ($\Delta cq$, $\Delta mq$, $\Delta yq$, $\Delta kq$) are added to the current output values (cq, mq, yq, kq), and the obtained values (cq+$\Delta cq$, mq+$\Delta mq$, yq+$\Delta yq$, kq+$\Delta kq$) become the updated output values. Here, the variable q is a variable for identifying the grid points in the adjustment range A0.

As described above, in the second color space CS2, the correspondence relationship of the adjustment target profile 550 is adjusted so that the current adjustment target color values $cmyk_p$ become closer to the target output values TargetOut. When information based on a designated intent is present in the adjustment target profile 550, the adjustment target profile 550 is adjusted with the correspondence relationship based on the designated intent.

After the adjustment target profile 550 has been updated, the host device 100 finds, for the respective adjustment points P0 input to the target reception area 840, the current adjustment target color values $cmyk_p$, using the updated adjustment target profile 550 or a combination of profiles including the updated adjustment target profile 550 (S316). The updated adjustment target color values $cmyk_p$ can be calculated using the same equations as in the process of S304, described with reference to FIGS. 11B to 11E and 13. When information based on the designated intent is in the profile, color conversion is carried out according to the information based on the designated intent.

Additionally, the host device 100 finds a difference d between the updated adjustment target color values $cmyk_p$ and the target output values TargetOut, for the respective adjustment points P0 input in the target reception area 840 (S318). This difference can be, for example, a Euclidean distance between points corresponding to the adjustment target color values $cmyk_p$ in the output color space CS5 of the adjustment target profile 550 and points corresponding to the target output values TargetOut.

Then, the host device 100 determines whether conditions for ending the repeated processing of S308 to S320 have been satisfied (S320), and repeats the processing of S308 to S320 when the conditions for ending have not been satisfied. When the conditions for ending have been satisfied, the host device 100 stores the adjusted adjustment target profile 550 in the storage device 114, and terminates the profile adjustment process. For example, the conditions for ending can be considered to be satisfied when the difference d is less than or equal to a prescribed threshold for all of the adjustment points P0. Alternatively, the conditions for ending may be considered to be satisfied upon a prescribed number being reached.

According to the foregoing, the adjustment target profile 550 is adjusted so that the adjustment target color values $cmyk_p$ obtained from the input coordinate values corresponding to the adjustment points P0, in accordance with the current adjustment target profile 550 or a combination of profiles including the adjustment target profile 550, become closer to the target output values TargetOut. In this manner, the adjustment target profile 550 is adjusted using coordinate values expressing the output colors ($cmyk_p$) as a reference, and thus the specific example can adjust the profile used to convert the coordinate values in the color space so that the profile has good color reproduction accuracy. At this time, the solution $\Delta cmyk_b$ of the adjustment color values $\Delta cmyk$, optimized so that a difference (relative value $\Delta Lab_{T-p}$) of the adjustment target T0, which uses the Lab color space (CS3) expressing the colors of the patches in the color charts CH0 and CH1 as a reference, becomes as low as possible, is used. Accordingly, the profile can be adjusted so that the color reproduction accuracy is even better.

6. MODIFIED EXAMPLES

Various modified examples are conceivable in the disclosure.

For example, the output device is not limited to an ink jet printer, and may be an electrophotographic-type printer such as a laser printer using toner as the color materials, a three-dimensional printer, a display device, and the like.

The types of the color materials forming the images are not limited to C, M, Y, and K. In addition to C, M, Y, and K, Dy (dark yellow), Or (orange), and Gr (green) which are darker than Lc, Lm, and Y, Lk (light black) which is lighter than K, colorless color materials for improving image quality, and the like may be included as well.

Of course, the second color space is not limited to the cmyk color space, and may be the CMY color space, the RGB color space, and the like.

The target device is not limited to a target printing press, and may be a display device and the like.

Of course, the first color space is not limited to the CMYK color space, and may be the CMY color space, the RGB color space, and the like.

The above-described processes can be changed as appropriate, such as by rearranging the order. For example, in the optimization process of FIG. 8, at least a part of the processing for calculating the color difference square $\Delta E_{00}^2$ in S212 to S216 can be carried out after the process of S218 or S220.

Additionally, the process of calculating the cost C in S220 may be omitted, and the target function $y=\Delta E_{002}+w \times V^2$ may be calculated in the calculation process of S222. In this case too, the color reproduction accuracy of the adjustment target profile 550 can be improved by setting, as the optimal solution $\Delta cmyk_b$, the optimal solution candidates $\Delta cmyk_{pb}$ in a case that the values of the target functions y obtained from the plurality of initial values $\Delta cmyk_i$ are the lowest, in the optimal solution determination process of S232.

Furthermore, the process of calculating the square $V^2$ of the magnitudes of the vectors of the adjustment color values $\Delta cmyk$ in S218 may be omitted, and the target function $y=\Delta E_{00}^2$, or $y=\Delta E_{00}^2+C$ may be calculated in the calculation process of S222. In this case too, the color reproduction accuracy of the adjustment target profile 550 can be improved by setting, as the optimal solution $\Delta cmyk_b$, the optimal solution candidates $\Delta cmyk_{pb}$ in a case that the values of the target functions y obtained from the plurality of initial values $\Delta cmyk_i$ are the lowest, in the optimal solution determination process of S232.

Furthermore, even in a case where the initial values $\Delta cmyk_i$ of the adjustment color values $\Delta cmyk$ are consolidated as $(\Delta c_i, \Delta m_i, \Delta y_i, \Delta k_i)=(0, 0, 0, 0)$ and the like, the optimal solution $\Delta cmyk_b$ of the adjustment color values $\Delta cmyk$ at which the difference (relative value $\Delta Lab_{T-p}$) of the adjustment target T0, using the PCS CS3 as a reference, becomes the lowest, can be obtained. The color reproduction accuracy of the profile can be improved by adjusting the profile using the optimal solution $\Delta cmyk_b$.

Even in a case where the device link profile is removed from the adjustment target profiles, the basic actions and effects of this technique can be achieved.

Additionally, even in a case where the adjustment target profile is limited to the output profile, the basic actions and effects of this technique can be achieved.

Furthermore, even in a case where a combination of the input profile and the output profile are used in the color conversion and the adjustment target profile is limited to the input profile, the basic actions and effects of this technique can be achieved.

7. CONCLUSION

As described thus far, according to the invention a technique and the like that improve the color reproduction accuracy of a profile used to convert coordinate values in a color space can be provided through various aspects. Of course, the above-described basic actions and effects are achieved by techniques implemented using only the constituent elements of the independent claims.

Additionally, configurations in which the configurations disclosed in the above-described examples are replaced with each other, or the combinations thereof are changed, configurations in which known techniques and the configurations disclosed in the above-described examples are replaced with each other, or the combinations thereof are changed, and the like are also possible. The invention also includes these configurations.

This application claims priority under 35 U.S.C. § 119 to Japanese Patent Application No. 2017-189322, filed Sep. 29, 2017. The entire disclosure of Japanese Patent Application No. 2017-189322 is hereby incorporated herein by reference.

What is claimed is:

1. A profile adjustment method that carries out, by a computer, a process of adjusting an adjustment target profile among a plurality of profiles including an input profile expressing a correspondence relationship between first coordinate values in a first device-dependent color space and device-independent coordinate values in a profile connection space and an output profile expressing a correspondence relationship between the device-independent coordinate values and second coordinate values in a second device-dependent color space, the profile adjustment method comprising:

the output profile including a first conversion table for converting the device-independent coordinate values into the second coordinate values and a second conversion table for converting the second coordinate values into the device-independent coordinate values;

receiving an adjustment target at an adjustment point, using coordinates in a profile connection space as a reference;

converting the device-independent coordinate values at the adjustment point into the second coordinate values in accordance with the first conversion table, and converting the second coordinate values into adjustment target PCS values as the device-independent coordinate values, in accordance with the second conversion table;

when values obtained by adding relative values of the adjustment target using the coordinates in the profile connection space as a reference to the adjustment target PCS values are assumed as target PCS values, the second coordinate values at the adjustment point are assumed as adjustment target color values, and values added to the adjustment target color values are assumed as adjustment color values, obtaining an optimal solution of the adjustment color values through an optimization process including an element that brings provisional PCS values, obtained by converting, according to the second conversion table, provisional color values obtained by adding the adjustment color values to the adjustment target color values, closer to the target PCS values; and adjusting the adjustment target profile based on the optimal solution of the adjustment color values.

2. The profile adjustment method according to claim 1, wherein in the converting, the first coordinate values at the adjustment point are converted into the device-independent coordinate values in accordance with the input profile, the device-independent coordinate values are converted into the second coordinate values in accordance with the first conversion table, and the second coordinate values are converted into the adjustment target PCS values in accordance with the second conversion table.

3. The profile adjustment method according to claim 1, wherein in the obtaining of an optimal solution, the optimal solution is obtained through the optimization process using a target function including a square of a color difference between the provisional PCS values and the target PCS values.

4. The profile adjustment method according to claim 1, wherein in the obtaining of an optimal solution, the optimal solution is obtained through the optimization process using a target function including a color difference between the provisional PCS values and the target PCS values, and including, in addition to the color difference, a magnitude of vectors when the adjustment color values are expressed as the vectors in the second device-dependent color space.

5. The profile adjustment method according to claim 1, wherein in the obtaining of an optimal solution, the optimal solution is obtained through the optimization process by applying a range that the second coordinate values can take on to restriction conditions of a range of the provisional color values.

6. The profile adjustment method according to claim 1, wherein in the obtaining of an optimal solution, a plurality of initial values of the adjustment color values are used in the optimization process, a plurality of optimal solution candidates of the adjustment color values are obtained by carrying out the optimization process using the target function respectively to the plurality of initial values, and the optimal solution is obtained based on the plurality of optimal solution candidates.

7. The profile adjustment method according to claim 1, further comprising:

receiving one profile among the plurality of profiles as the adjustment target profile.

8. The profile adjustment method according to claim 2, wherein in the obtaining of an optimal solution, the optimal solution is obtained through the optimization process using a target function including a square of a color difference between the provisional PCS values and the target PCS values.

9. The profile adjustment method according to claim 2, wherein in the obtaining of an optimal solution, the optimal solution is obtained through the using a target function including a color difference between the provisional PCS values and the target PCS values, and including, in addition to the color difference, a magnitude of vectors when the adjustment color values are expressed as the vectors in the second device-dependent color space.

10. The profile adjustment method according to claim 3, wherein in the obtaining of an optimal solution, the optimal solution is obtained through the optimization process using a target function including a color difference between the provisional PCS values and the target PCS values, and including, in addition to the color difference, a magnitude of vectors when the adjustment color values are expressed as the vectors in the second device-dependent color space.

11. The profile adjustment method according to claim 2, wherein in the obtaining of an optimal solution, the optimal solution is obtained through the optimization process by applying a range that the second coordinate values can take on to restriction conditions of a range of the provisional color values.

12. The profile adjustment method according to claim 3, wherein in the obtaining of an optimal solution, the optimal solution is obtained through the optimization process by applying a range that the second coordinate values can take on to restriction conditions of a range of the provisional color values.

13. The profile adjustment method according to claim 4, wherein in the obtaining of an optimal solution, the optimal solution is obtained through the optimization process by applying a range that the second coordinate values can take on to restriction conditions of a range of the provisional color values.

14. The profile adjustment method according to claim 2, wherein in the obtaining of an optimal solution, a plurality of initial values of the adjustment color values are used in the optimization process, a plurality of optimal solution candidates of the adjustment color values are obtained by carrying out the optimization process using the target function respectively to the plurality of initial values, and the optimal solution is obtained based on the plurality of optimal solution candidates.

15. The profile adjustment method according to claim 3, wherein in the obtaining of an optimal solution, a plurality of initial values of the adjustment color values are used in the optimization process, a plurality of optimal solution candidates of the adjustment color values are obtained by carrying out the optimization process using the target function respectively to the plurality of initial values, and the optimal solution is obtained based on the plurality of optimal solution candidates.

16. The profile adjustment method according to claim 4, wherein in the obtaining of an optimal solution, a plurality of initial values of the adjustment color values are used in the optimization process, a plurality of optimal solution candidates of the adjustment color values are obtained by carrying out the optimization process using the target function respectively to the plurality of initial values, and the optimal solution is obtained based on the plurality of optimal solution candidates.

17. The profile adjustment method according to claim 5, wherein in the obtaining of an optimal solution, a plurality of initial values of the adjustment color values are used in the optimization process, a plurality of optimal solution candidates of the adjustment color values are obtained by carrying out the optimization process using the target function respectively to the plurality of initial values, and the optimal solution is obtained based on the plurality of optimal solution candidates.

18. The profile adjustment method according to claim 2, further comprising:
receiving one profile among the plurality of profiles as the adjustment target profile.

19. A profile adjustment apparatus that adjusts an adjustment target profile among a plurality of profiles including an input profile expressing a correspondence relationship between first coordinate values in a first device-dependent color space and device-independent coordinate values in a profile connection space and an output profile expressing a correspondence relationship between the device-independent coordinate values and second coordinate values in a second device-dependent color space, the profile adjustment apparatus comprising:
the output profile including a first conversion table for converting the device-independent coordinate values into the second coordinate values and a second conversion table for converting the second coordinate values into the device-independent coordinate values;
a target reception unit configured to receive an adjustment target at an adjustment point, using coordinates in a profile connection space as a reference;
a conversion unit configured to convert the device-independent coordinate values at the adjustment point into the second coordinate values in accordance with the first conversion table, and convert the second coordinate values into adjustment target PCS values as the device-independent coordinate values, in accordance with the second conversion table;
an optimizing unit configured to, when values obtained by adding relative values of the adjustment target using the coordinates in the profile connection space as a reference to the adjustment target PCS values are assumed as target PCS values, the second coordinate values at the adjustment point are assumed as adjustment target color values, and values added to the adjustment target color values are assumed as adjustment color values, obtain an optimal solution of the adjustment color values through an optimization process including an element that brings provisional PCS values, obtained by converting, according to the second conversion table, provisional color values obtained by adding the adjustment color values to the adjustment target color values, closer to the target PCS values; and
a profile adjustment unit configured to adjust the adjustment target profile based on the optimal solution of the adjustment color values.

20. A profile adjustment system that adjusts an adjustment target profile among a plurality of profiles including an input profile expressing a correspondence relationship between first coordinate values in a first device-dependent color space and device-independent coordinate values in a profile connection space and an output profile expressing a correspondence relationship between the device-independent coordinate values and second coordinate values in a second device-dependent color space, the profile adjustment system comprising:
the output profile including a first conversion table for converting the device-independent coordinate values into the second coordinate values and a second conversion table for converting the second coordinate values into the device-independent coordinate values;
a printing apparatus configured to print a color chart including a patch;
a colorimetric device configured to measure the patch;
a target reception unit configured to receive an adjustment target at an adjustment point, using coordinates in a profile connection space as a reference;
a conversion unit configured to convert the device-independent coordinate values at the adjustment point into the second coordinate values in accordance with the first conversion table, and convert the second coordinate values into adjustment target PCS values as the device-independent coordinate values, in accordance with the second conversion table;
an optimizing unit configured to, when values obtained by adding relative values of the adjustment target using the coordinates in the profile connection space as a reference to the adjustment target PCS values are assumed as target PCS values, the second coordinate values at the adjustment point are assumed as adjustment target color values, and values added to the adjustment target color values are assumed as adjustment color values, obtain an optimal solution of the adjustment color values through an optimization process including an element that brings provisional PCS values, obtained by converting, according to the second conversion table, provisional color values obtained by adding the adjustment color values to the adjustment target color values, closer to the target PCS values; and
a profile adjustment unit configured to adjust the adjustment target profile based on the optimal solution of the adjustment color values.

* * * * *